(12) United States Patent
Fukuoka et al.

(10) Patent No.: US 10,712,192 B2
(45) Date of Patent: Jul. 14, 2020

(54) INFORMATION PROCESSING APPARATUS, INFORMATION PRESENTATION APPARATUS, INFORMATION PRESENTATION SYSTEM, AND RECORDING MEDIUM

(71) Applicant: KYOCERA Corporation, Kyoto-shi, Kyoto (JP)

(72) Inventors: Yasuhiko Fukuoka, Yokohama (JP); Takahisa Yamamoto, Yokohama (JP); Djuniadi Arifin Sagala, Yokohama (JP); Katsuro Nakamata, Yokohama (JP); Takanori Ikuta, Yokohama (JP); Shinji Isoyama, Yokohama (JP); Jun Kitakado, Yokohama (JP); Takahiro Saiwai, Yokohama (JP); Atsuhisa Inakoshi, Yokohama (JP); Nobuki Hiramatsu, Yokohama (JP); Takuya Kuribayashi, Utsunomiya (JP); Sunao Hashimoto, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 376 days.

(21) Appl. No.: 15/790,322

(22) Filed: Oct. 23, 2017

(65) Prior Publication Data

US 2018/0113019 A1    Apr. 26, 2018

(30) Foreign Application Priority Data

Oct. 24, 2016  (JP) .................................. 2016-208180
Oct. 24, 2016  (JP) .................................. 2016-208181

(Continued)

(51) Int. Cl.
| | | |
|---|---|---|
| *G01F 23/00* | (2006.01) |
| *G01F 23/22* | (2006.01) |
| *G01F 22/00* | (2006.01) |

(52) U.S. Cl.
CPC .......... *G01F 23/0069* (2013.01); *G01F 22/00* (2013.01); *G01F 23/0076* (2013.01); *G01F 23/22* (2013.01)

(58) Field of Classification Search
CPC ............ G01F 23/0069; G01F 23/0076; G01F 23/0007; G01F 22/00
See application file for complete search history.

(56) References Cited

U.S. PATENT DOCUMENTS

| | | | | |
|---|---|---|---|---|
| 2006/0000277 A1* | 1/2006 | Pietrorazio | ............. | G01F 22/00 73/293 |
| 2014/0372045 A1* | 12/2014 | Keski-Pukkila | ..... | A61B 5/4875 702/19 |
| 2016/0022209 A1* | 1/2016 | Fraisl | ........................ | A45F 3/16 600/590 |

FOREIGN PATENT DOCUMENTS

| | | |
|---|---|---|
| JP | 2001-229466 A | 8/2001 |
| JP | 2005-253850 A | 9/2005 |
| JP | 2010-191500 A | 9/2010 |
| JP | 2012-170525 A | 9/2012 |

OTHER PUBLICATIONS

Office Action in JP Application No. 2016-208181, dated Jan. 17, 2017, for which an explanation of relevance is attached. 3pp.

(Continued)

*Primary Examiner* — Michael J Dalbo
(74) *Attorney, Agent, or Firm* — Hauptman Ham, LLP

(57) ABSTRACT

An information processing apparatus includes a communication interface and a controller. The communication interface receives, from a sensor container, information indicating an orientation of the sensor container. The controller, based on the information indicating the orientation of the (Continued)

sensor container, calculates a calculated value indicating a remaining amount of contents of the sensor container. The controller determines an estimated value of the remaining amount on the basis of the calculated value. The communication interface transmits the estimated value indicating the remaining amount to an external device. When the calculated value indicating the remaining amount decreases by a first predetermined value or more within a predetermined time period, the controller does not perform the determination of the estimated value on the basis of the calculated value.

8 Claims, 11 Drawing Sheets

(30) Foreign Application Priority Data

Oct. 24, 2016 (JP) ................................ 2016-208182
Apr. 24, 2017 (JP) ................................ 2017-085700

(56) References Cited

OTHER PUBLICATIONS

Office Action in JP Application No. 2016-208181, dated Apr. 11, 2017, for which an explanation of relevance is attached. 3pp.
Office Action in JP Application No. 2016-208181, dated Sep. 19, 2017, for which an explanation of relevance is attached. 3pp.

* cited by examiner

INFORMATION PROCESSING APPARATUS, INFORMATION PRESENTATION APPARATUS, INFORMATION PRESENTATION SYSTEM, AND RECORDING MEDIUM

CROSS REFERENCE TO RELATED APPLICATIONS

This application claims priority to and the benefit of Japanese Patent Applications No. 2016-208180 filed on Oct. 24, 2016, No. 2016-208181 filed on Oct. 24, 2016, No. 2016-208182 filed on Oct. 24, 2016, and No. 2017-085700 filed on Apr. 24, 2017, the entire contents of which are incorporated herein by reference.

TECHNICAL FIELD

This disclosure relates to an information processing apparatus, an information presentation apparatus, an information presentation system, and a recording medium.

BACKGROUND

In the prior art, techniques for obtaining information indicating a remaining amount of contents of a container have been developed. For example, patent literature PLT1 discloses a drink refill timing detection system in which, when a container is tilted at an angle larger than a predetermined angle, a refill signal is wirelessly transmitted by movement of a small ball provided to a bottom of the container. Also, patent literature PLT 2 discloses an instruction system which measures a remaining amount of the contents of a container with a remaining amount measuring instrument provided to the container and, when the remaining amount of the contents reaches a predetermined threshold or less, sends information to that effect to a server.

CITATION LIST

Patent Literature

PLT 1: JP-A-2012-170525
PLT 2: JP-A-2010-191500

SUMMARY

An information processing apparatus according to one embodiment of the disclosure includes a communication interface and a controller. The communication interface receives, from a sensor container, information indicating an orientation of the sensor container. The controller, based on the information indicating the orientation of the sensor container, calculates a calculated value indicating a remaining amount of contents of the sensor container. The controller, based on the calculated value, determines an estimated value indicating the remaining amount. The communication interface transmits the estimated value indicating the remaining amount to an external device. When the calculated value decreases by a first predetermined value or more within a predetermined time period, the controller does not perform the determination of the estimated value on the basis of the calculated value.

An information presentation apparatus according to one embodiment of the disclosure includes a communication interface, a controller, and an information presentation unit. The communication interface receives, from a sensor container, information indicating an orientation of the sensor container. The controller calculates, based on the information indicating the orientation of the sensor container, a calculated value indicating a remaining amount of contents of the sensor container. The controller, based on the calculated value, determines an estimated value indicating the remaining amount and also determines presentation information based on the estimated value indicating the remaining amount. The information presentation unit presents the presentation information. When the calculated value indicating the remaining amount decreases by a predetermined value or more within a predetermined time period, the controller does not perform the determination on the estimated value on the basis of the calculated value.

An information presentation system according to one embodiment of the disclosure includes a sensor container, an information processing apparatus, and an information presentation apparatus. The sensor container includes a container, a sensor, and a first communication interface. The sensor acquires information indicating an orientation of the container. The first communication interface transmits the information indicating the orientation of the container to an external device. The information processing apparatus includes a second communication interface and a first controller. The second communication interface receives the information indicating the orientation of the sensor container from the sensor container. The first controller, based on the information indicating the orientation of the sensor container, calculates a calculated value indicating a remaining amount of contents of the sensor container. The first controller determines an estimated value indicating the remaining amount based on the calculated value. The second communication interface transmits the remaining amount to an external device. When the calculated value indicating the remaining amount decreases by a predetermined value or more within a predetermined time period, the controller does not perform the determination on the estimated value on the basis of the calculated value. The information presentation apparatus includes a third communication interface, a second controller, and an information presentation unit. The third communication interface receives the estimated value indicating the remaining amount from the information processing apparatus. The second controller determines presentation information based on the estimated value indicating the remaining amount. The information presentation unit presents the presentation information.

A non-transient computer readable storage medium according to one embodiment of the disclosure which stores program instructions which, when executed by an information processing apparatus, causes the information processing apparatus to: receive information indicating an orientation of a container, calculate a calculated value indicating a remaining amount of contents of the container based on the information indicating the orientation of the container, and determine an estimated value indicating the remaining amount based on the calculated value. The program causes the information processing apparatus to transmit the estimated value indicating the remaining amount to an external device. When the calculated value indicating the remaining amount decreases by a predetermined value or more within a predetermined time period, determination of the estimated value on the basis of the calculated value is not performed.

DETAILED DESCRIPTION

Figure 1:
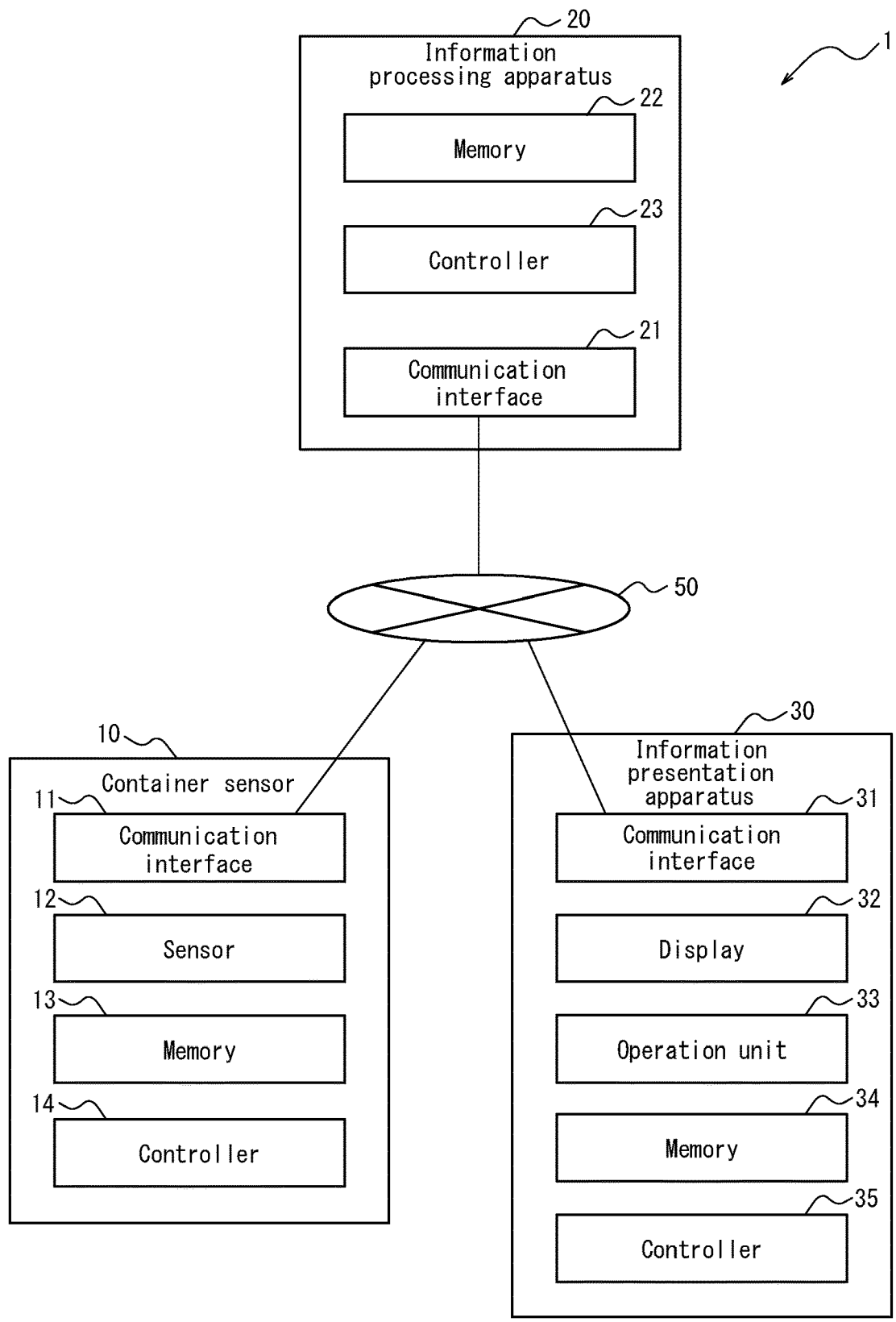
FIG. 1 is a block diagram illustrating a schematic configuration of an information presentation system according to an embodiment of the disclosure.

Hereinafter, embodiments of the disclosure will be described with reference to the accompanying drawings.
Summary of Information Presentation System Referring to FIG. 1, a summary of an information presentation system 1 according to one embodiment will be described. The information presentation system 1 includes a container sensor 10, an information processing apparatus 20, and an information presentation apparatus 30. The container sensor 10, the information processing apparatus 20, and the information presentation apparatus 30 are capable of communicating with one another via a network 50. The network 50 may include at least one circuit for performing, for example, wireless communication or wired communication. The network 50 may include a LAN (Local Area Network), a WAN (Wide Area Network), the Internet, or the like. Additional communication apparatuses may be interposed between the apparatuses which perform communication as illustrated in FIG. 1. Such a communication apparatus may include, for example, router equipment and access point equipment.

The container sensor 10 may be attached to a variety of containers. The container sensor 10 and a container may be collectively referred to as a sensor container. The appearance of a plurality of the container sensors 10 may differ with respect to each other in terms of shape, pattern, color, marking, material, and so on. Markers, such as glass markers, bottle markers, cup markers, and wine markers, may be utilized to enable discrimination between a plurality of the container sensors 10. The container sensor 10 may be integrally formed with a container. For example, the container sensor 10 is built into a base member of a container. A container equipped with the container sensor 10 may be referred to as the sensor container. The container may include any receptacle including, for example, a cup, a mug, a glass, a cylinder, a carton, a bottle, a bowl, a mixing bowl, a sake cup, a sake bottle, a basin, a pot, a kettle, a tray, a tank, a bucket, a watering pot, a kettle, a pitcher, and a tin container. The container sensor 10 detects or acquires information indicating an orientation of the container. The information indicating the orientation will be described in detail below. The container sensor 10 transmits the information indicating the orientation to the information processing apparatus 20.

The information processing apparatus 20 may include any apparatus that has an information processing function. For example, an apparatus such as a server apparatus, PC (Personal Computer), a smartphone, or a tablet type terminal device may be employed as the information processing apparatus 20. The information processing apparatus 20 receives the information indicating the orientation from the container sensor 10. The information processing apparatus 20 determines information indicating a remaining amount of the contents of the container on the basis of the information indicating the orientation. Details of the information indicating the remaining amount will be described below. The information processing apparatus 20 transmits the determined information indicating the remaining amount to the information presentation apparatus 30.

The information presentation apparatus 30 may include any apparatus that has a function for presenting information to a user. According to the disclosure, a process to present the information may include, for example, a process for displaying the information on a display and/or a process for generating an audio output of the information. For example, an apparatus such as a PC, a smartphone, a tablet type terminal device, or a PDA (Personal Data Assistant) type terminal device may be employed as the information presentation apparatus 30. The information presentation apparatus 30 receives the information indicating the remaining amount from the information processing apparatus 20. The information presentation apparatus 30 presents presentation information on the basis of on the received information indicating the remaining amount. Details of the presentation information will be described below.

The information presentation system 1 may be used for a variety of services. By way of example, an embodiment in which the information presentation system 1 is used for a food and drink providing service will be described. A facility that utilizes the service provided by the information presentation system 1 comprises at least one container sensor 10 and at least one information presentation apparatus 30. Such a facility may include, for example, a dining/drinking place such as a restaurant or a tavern, and an event hall such as a funeral hall, a religious service hall, and a ceremonial hall. The information processing apparatus 20 may be provided at any location. The information processing apparatus 20 may be provided, for example, inside or outside a facility using the service of the information presentation system 1.

Figure 2:
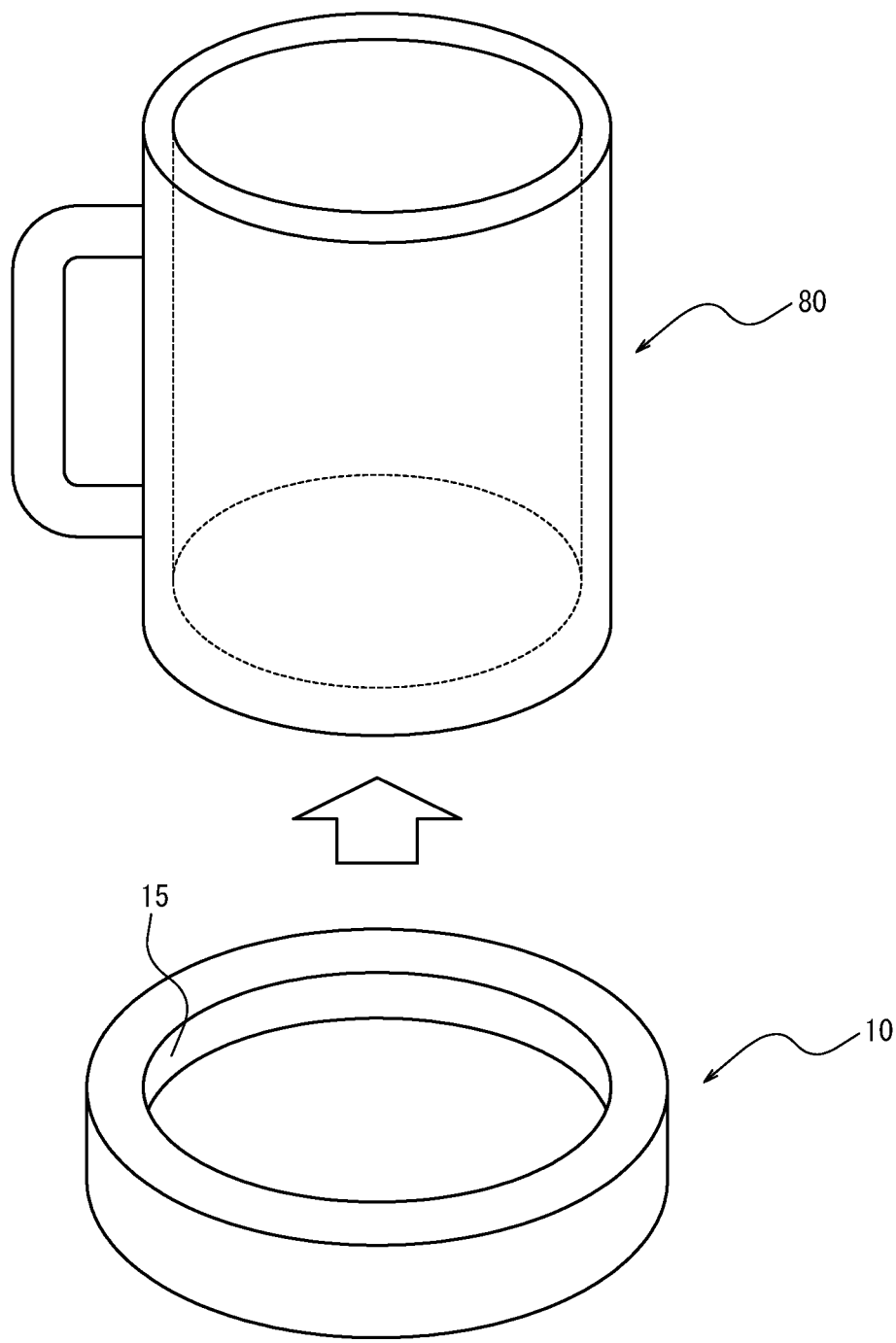
FIG. 2 is a diagram illustrating attachment of a container sensor to a container.

The container sensor 10, as illustrated in FIG. 2, may include an attaching portion 15 that may be attached to a container 80 of a drink ordered by a customer of the dining/drinking place. The container sensor 10 is attached to the container 80 via the attaching portion 15. The container sensor 10 may be attached to the container 80 at any position and using any suitable technique. For example, the container sensor 10 may be fitted to a bottom portion of the container 80 via the attaching portion 15.

The information presentation apparatus 30 may be positioned in, for example, a backyard of a store, or may be carried by a waiter/waitress. The information presentation apparatus 30 presents presentation information indicating that, for example, a remaining amount of a customer's drink has become low. The waiter/waitress, based on this presentation information, is able to recognize that the remaining amount of the customer's drink has become low. That is, even when the drink container is opaque and the remaining amount is not visible, the waiter/waitress is able to recognize, based on the presentation information, that the remaining amount of the customer's drink has become low. Based on the presentation information, the waiter/waitress may, for example, proactively approach the customer to take the customer's order before the customer makes a further drink order. The presentation information enables the waiter/waitress to, for example, recognize the status of the customer's drink without actually looking at the container of drink. As such, stores using the information presentation system 1 may improve service quality associated with the provision of food and drink to customers. Moreover, the information presentation system 1 is very convenient for the waiter/waitress.

The information presentation apparatus 30 may be provided at a customer seat, for example. In this case, the information presentation apparatus 30 is able to receive an order made in accordance with a user operation. The information presentation apparatus 30 presents, for example, presentation information indicating that the remaining amount of the customer's drink has become low. Even when the drink container and a remaining amount in a container of a customer in the same group not visible due to opaqueness of the container, another customer may recognize, based on the presentation information, that the remaining amount of the customer's drink has become low. This enables the customer to make a next drink order when, for example, the remaining amount of the drink has become low. As such, the information presentation system 1 offers a high level of convenience to customers. The information presentation system 1 actively motivates the customer to make a next drink/food order. Therefore, the information presentation system 1 is highly convenient to the store.

Constituent elements of the information presentation system 1 will now be described in detail.

Container Sensor

As illustrated in FIG. 1, the container sensor 10 includes a communication interface 11, a sensor 12, a memory 13, and a controller 14.

The communication interface 11 of the container sensor 10 includes an interface configured to transmit and receive information via the network 50. For example, the communication interface 11 may include an antenna for wireless communication.

Figure 3A:
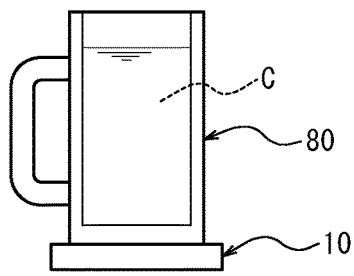
FIG. 3A to FIG. 3D are diagrams illustrating orientations of the container having the container sensor attached thereto.
Figure 3B:
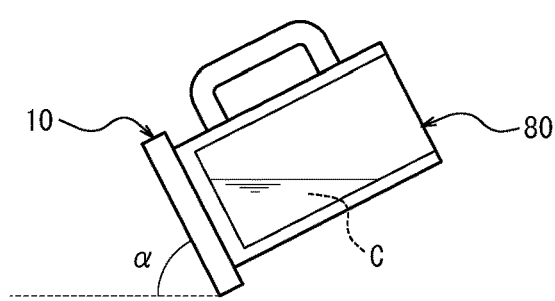
Figure 3C:
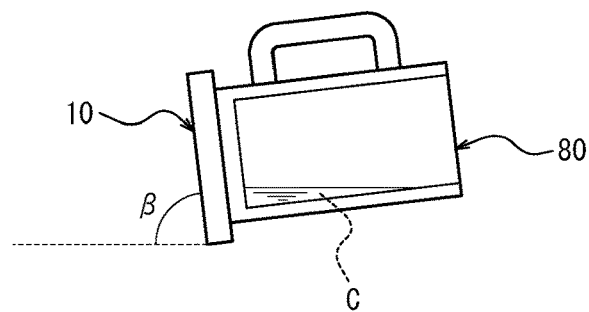
Figure 3D:
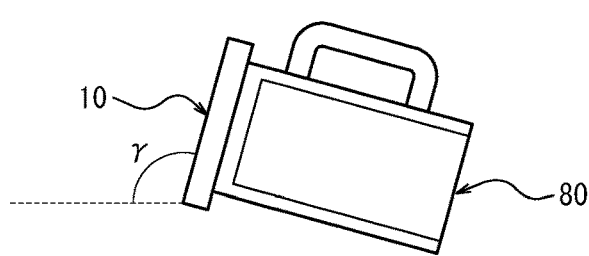

The sensor 12 of the container sensor 10 detects or acquires information indicating the orientation of the container 80. The orientation of the container 80 may change when, for example, the customer drinks the contents of the container 80. The information indicating the orientation may include, for example, a tilt of the container 80. The tilt of the container 80 corresponds to an angle formed between a horizontal plane and the bottom portion of the container 80, for example In FIG. 3A, for example, the tilt of the container 80 is 0 degrees. In FIG. 3B, the tilt of the container 80 is $\alpha$ degrees. In FIG. 3C, the tilt of the container 80 is $\beta$ degrees. In FIG. 3D, the tilt of the container 80 is $\gamma$ degrees. In examples illustrated in FIGS. 3A to 3D, the tilt angles satisfy the relationship $0<\alpha<\beta<\gamma$. An acceleration sensor or a gyro sensor may be employed as the sensor 12, for example The orientation of the container 80 is related to the remaining amount of the contents of the container 80. As illustrated in FIGS. 3A to 3D, for example, as the tilt of the container 80 becomes greater, the remaining amount of contents C of the container 80 become less. Therefore, based on the information indicating the orientation of the container 80, the remaining amount of the contents of the container 80 may be estimated. In an embodiment, the remaining amount of the contents of the container 80 may be estimated by the information processing apparatus 20, as described below.

The memory 13 of the container sensor 10 may include, for example, a primary memory apparatus and/or a secondary memory apparatus. The memory 13 may include, for example, a semiconductor memory, a magnetic memory, and/or an optical memory. The memory 13 stores various information and program instructions necessary for operation of the container sensor 10.

The controller 14 of the container sensor 10 includes at least one processor. The processor may include a general-purpose processor configured to load a specific program and to execute specific functions, and/or a specialized processor dedicated to one or more specific processes. The specialized processor may include Application Specific Integrated Circuit (ASIC). The processor may include Programmable Logic Device (PLD). The PLD may include Field-Programmable Gate Array (FPGA). The controller 14 may be either SoC (System-on-a-Chip) having one or more processors cooperating with one another, or SiP (System In a Package). The controller 14 controls overall operation of the container sensor 10.

The controller 14 acquires information indicating the orientation of the container 80 from the sensor 12. The information indicating the orientation may include a numerical value that can uniquely specify the orientation of the container 80. The information indicating the orientation may include a numerical value that uniquely indicates the orientation of the container 80. The information indicating the orientation may include a numerical value that can uniquely determine a tilt angle of the container 80. The information indicating the orientation may include a numerical value that uniquely indicates the tilt angle of the container 80. The information indicating the orientation may include a numerical value indicative of a temporal change in the tilt angle of the container 80. The information indicating the orientation may include raw data acquired by an acceleration sensor or a gyro sensor which serve as the sensor 12. The controller 14 may temporarily store the information indicating the orientation in the memory 13. The controller 14 transmits the information indicating the orientation to an external device via the communication interface 11. The controller 14 may successively transmit the information indicating the orientation. The controller 14 may transmit the information indicating the orientation acquired from the sensor 12 at predetermined intervals. The controller 14 may transmit time series data summarized for a predetermined time unit. The controller 14 may transmit most recent data in the predetermined time unit. The controller 14 may specify the information processing apparatus 20 as an information transmission destination and transmit the information indicating the orientation thereto. The controller 14 may transmit the information indicating the orientation without specifying the information transmission destination. In this case, the communication apparatus interposed between the container sensor 10 and the information processing apparatus 20 may relay the information indicating the orientation received from the container sensor 10 to the information processing apparatus 20. The controller 14 may transmit, together with the information indicating the orientation, identification (ID) information of the container sensor 10. The ID information of the container sensor 10 may include, for example, a Media Access Control (MAC) address and/or an Internet Protocol (IP) address. The controller 14 may transmit, together with the information indicating the orientation, positional information of the container sensor 10. The positional information of the container sensor 10 may be acquired by using, for example, a Global Positioning System (GPS) module provided to the container sensor 10, or acquired from the communication apparatus mentioned above.

Information Processing Apparatus

As illustrated in FIG. 1, the information processing apparatus 20 includes a communication interface 21, a memory 22, and a controller 23.

The communication interface 21 of the information processing apparatus 20 includes an interface configured to transmit and receive information via the network 50.

The memory 22 of the information processing apparatus 20 may include, for example, a primary memory apparatus and/or a secondary memory apparatus. The memory 22 may include, for example, semiconductor memory, magnetic memory, or optical memory. The memory 22 stores various information and programs necessary for an operation of the information processing apparatus 20.

The controller 23 of the information processing apparatus 20 includes at least one processor. The controller 23 may control overall operation of the information processing apparatus 20. The information processing apparatus 20 may be configured to implement processing performed by the controller 23 described below by reading program instructions stored in a non-transitory computer-readable medium. Such a non-transitory computer-readable media may include, but not limited to, a magnetic recording media, an optical recording media, a magneto-optical recording media, or a semiconductor recording media.

For example, the controller 23 receives the information indicating the orientation of the container 80 from the container sensor 10 via the communication interface 21. The controller 23 stores the information indicating the orientation in the memory 22. The controller 23 may estimate the orientation of the container 80 on the basis of the information indicating the orientation. The controller 23 determines information indicating the remaining amount of the contents of the container 80 based on the information indicating the orientation. The information indicating the remaining amount may include, for example, an estimated value of the remaining amount of the contents of the container 80. A process to determine the information indicating the remaining amount may include a process to estimate the remaining amount. A process for estimating the remaining amount may employ any suitable algorithm.

The controller 23 may estimate a maximum value of the tilt of the container 80 based on the information indicating the orientation. The controller 23 may estimate the remaining amount based on the maximum value of the tilt of the container 80. Hereinafter, the estimated value of the remaining amount determined is also referred to as an estimated remaining amount. Correspondence information indicative of correspondence between the tilt of the container 80 and the remaining amount of the contents may be preliminarily determined through, for example, experimentation, simulation, or statistical analysis. The correspondence information may be preliminarily stored as, for example, a lookup table in the memory 22. In the lookup table, for example, a tilt angle of 0 degrees is associated with the remaining amount of 100%. A tilt angle of 45 degrees is associated with the remaining amount of 50%. A tilt angle of 90 degrees or larger is associated with the remaining amount of 0%. The correspondence between the tilt of the container 80 and the remaining amount of the contents is not limited to the above example. For example, instead of a percentage value, the remaining amount of the contents may be indicated in terms of any unit indicative of a volume or mass of the remaining amount.

In estimating the remaining amount, the controller 23 may determine whether the tilt of the container 80 is an abnormal value. Any suitable algorithm may be employed to determinate whether the tilt of the container 80 indicated by the information indicating the orientation is an abnormal value. For example, when the maximum value of the tilt appears as a relatively sharp peak in temporal data of the tilt of the container 80, the controller 23 may determine that the maximum value is an abnormal value. When an absolute value of a time derivative value of the tilt of the container 80 is at a predetermined threshold or greater, the controller 23 may determine that a change in the tilt indicates an abnormal value. The controller 23 stops estimation of the remaining amount using the maximum value of the tilt that is determined as an abnormal value. In this way, the controller 23 may more accurately estimate the remaining amount of the contents of the container 80.

The controller 23 transmits the information indicating the remaining amount determined to the information presentation apparatus 30. The information indicating the remaining amount may include, for example, information indicating the remaining amount expressed by the percentage, or information indicating the remaining amount expressed in a predetermined unit indicative of the volume or the mass. The controller 23 may transmit, together with the information indicating the remaining amount, information received from the container sensor 10. The information received from the container sensor 10 may include the information indicating the orientation of the container 80, the ID information of the container sensor 10, and the positional information of the container sensor 10. The controller 23 may transmit time at which the information indicating the orientation is acquired.

Information Presentation Apparatus

As illustrated in FIG. 1, the information presentation apparatus 30 includes a communication interface 31, a display 32, an operation unit 33, a memory 34, and a controller 35.

The communication interface 31 of the information presentation apparatus 30 includes an interface configured to transmit and receive information via the network 50.

The display 32 of the information presentation apparatus 30 may include any display device. The display device may include, for example, a liquid crystal display and an organic Electroluminescence (EL) display.

The operation unit 33 of the information presentation apparatus 30 includes a user interface capable of receiving the user operation. The user interface may include, for example, a physical key, a touch key, a mouse, a touch panel, or a touchscreen. When the operation unit 33 includes the touchscreen, the display 32 and the operation unit 33 may be configured as one module.

The memory 34 of the information presentation apparatus 30 includes, for example, a primary memory apparatus or a secondary memory apparatus. The memory 34 may include, for example, a semiconductor memory, a magnetic memory, and/or an optical memory. The memory 34 stores various information and program instructions necessary for an operation of the information presentation apparatus 30.

The controller 35 of the information presentation apparatus 30 includes at least one processor. The controller 35 controls overall operation of the information presentation apparatus 30.

For example, the controller 35 stores, in the memory 34, first ID information that enables identification of each customer seat in the dining/drinking place. The first ID information may be preliminarily input by, for example, the waiter/waitress of the dining/drinking place.

The controller 35 stores, in the memory 34, second ID information that enables identification of a customer group having entered the dining/drinking place. The controller 35 may associate the first ID information corresponding to all seats used by a particular customer group with the second ID information for the particular customer group. The customer group is a group that includes at least one customer. Based on, for example, the user operation performed by the waiter/waitress of the dining/drinking place each time a customer group enters, the controller 35 may execute the above operation to associate the second ID information with the first ID information.

The controller 35 stores the ID information of the container sensor 10 in association with the second ID information of the customer group that is using the container sensor 10. Based on the user operation performed by the waiter/waitress when, for example, the waiter/waitress provides the customer group with drink in the container 80 having the container sensor 10 attached thereto, the controller 35 may execute the above operation to associate the ID information of the container sensor 10 with the second ID information of the customer group. Based on the positional information of the container sensor 10 attached to the container 80 provided to the customer group, the controller 35 may autonomously execute the above operation to associate the ID information of the container sensor 10 with the second ID information of the customer group. Based on, for example, the positional information of each customer seat preliminarily stored in the memory 34, the controller 35 specifies the customer seat corresponding to the position information of the container sensor 10. The controller 35 stores the ID information of the container sensor 10 in association with the second ID information of the customer group associated with the first ID information of the specified customer seat.

In this way, the customer seat, the customer group, and the container sensor 10 are associated with one another.

The controller 35 cancels the association between the ID information of the container sensor 10 and the second ID information of the customer group. The controller 35 initializes the information indicating the orientation of the container 80, the information indicating the remaining amount of the contents, and the presentation information which correspond to the container sensor 10. The controller 35 may execute the above operation to cancel the association and initialize the information on the basis of, for example, a user operation performed by the waiter/waitress of the dining/drinking place when the waiter/waitress collects the container 80 and the container sensor 10 from the customer group.

The controller 35 receives the information indicating the remaining amount of the contents of the container 80 from the information processing apparatus 20 via the communication interface 31. The controller 35 stores the information indicating the remaining amount in the memory 34.

The controller 35 may determine a remaining amount level corresponding to the estimated remaining amount based on the information indicating the remaining amount. The remaining amount level indicates a degree of the estimated remaining amount as compared to a predetermined reference value. The reference value and the remaining amount level may be determined in any manner. For example, when the estimated remaining amount is 0%, the controller 23 determines the remaining amount level as "empty". When the estimated remaining amount is greater than 0% and smaller than a first reference value, the controller 23 determines the remaining amount level as "low". When the estimated remaining amount is equal to or greater than the first reference value, the controller 23 determines the remaining amount level as "high". The controller 35, may change the above reference values for the container sensors 10 corresponding to a customer group based on information about the particular group. The information about the customer group may include, for example, information indicating an order frequency of the customer group. For example, when the order frequency of the customer group is equal to or higher than a predetermined reference frequency, the controller 35 may increase the reference values used for the determination on the remaining amount level. Or, when the order frequency of the customer group is lower than the predetermined reference frequency, the controller 35 may reduce the reference values used for the determination on the remaining amount level. The reference frequency may be determined in any manner.

The controller 35 determines the presentation information based on the information indicating the remaining amount. The controller 35 presents the determined presentation information. In an embodiment, the controller 35 causes the display 32 to display the presentation information as a screen. A detailed description of this operation follows below.

First Screen

Figure 4:
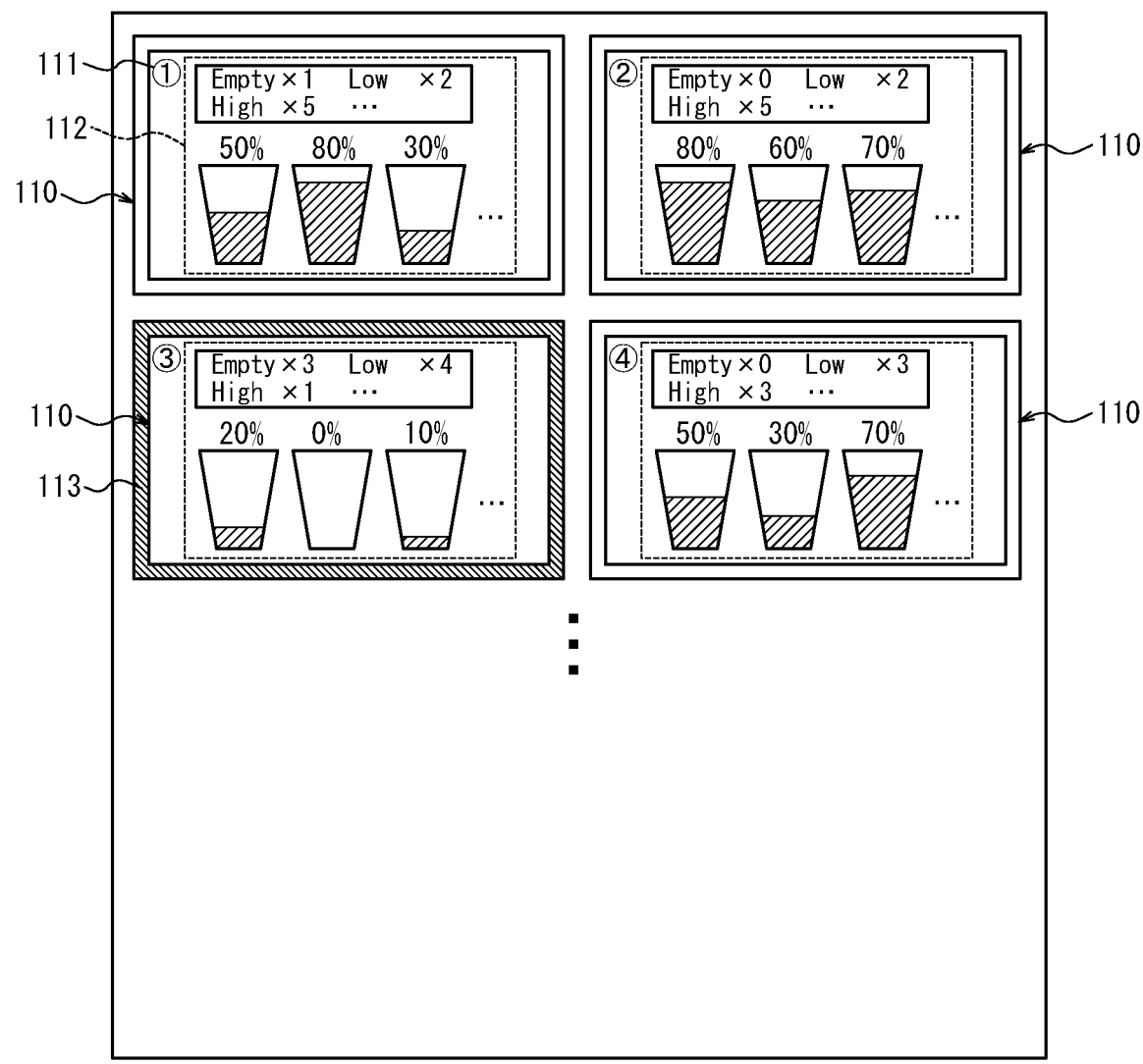
FIG. 4 is a diagram illustrating a first screen displayed in an information presentation apparatus.

The presentation information presented by the information presentation apparatus 30 which is, for example, positioned in the backyard of the dining/drinking place or carried by the waiter/waitress will be described in detail with reference to FIG. 4. The controller 35 of the information presentation apparatus 30 causes the display 32 to display at least one first screen 110 serving as the presentation information.

Each customer group is provided with a corresponding first screen 110. The first screen 110 may display any information about a corresponding customer group. For example, the first screen 110 may display the second ID information 111 of a corresponding customer group. An area 112 in the first screen 110 displays information indicating a remaining amount of each container 80 having been served to the customer group using characters and images. The area 112 displays the number of containers 80 having been served to the customer group for each remaining amount level.

The controller 35 may display warning information 113 for each customer group in accordance with the remaining amount level. The warning information 113 may include, for example, a character or an image. The warning information 113 enables the waiter/waitress of the dining/drinking place to recognize, at a glance, a customer group from which the waiter/waitress should preferentially take orders. Any suitable algorithm may be employed for processing to display the warning information 113.

For example, when the number of containers 80 with the remaining amount level of "empty" out of all of the containers 80 having been served to a particular customer group is equal to or greater than the predetermined reference number, the warning information 113 may be displayed in the first screen 110 corresponding to that particular customer group.

Alternatively, for each container 80 having been served to the customer group, the controller 35 may determine an evaluation value corresponding to the remaining amount level. For example, the controller 35 determines 2 points as the evaluation value of the container 80 having the remaining amount level of "empty". The controller 35 determines 1 point as the evaluation value of the container 80 having the remaining amount level of "low". The controller 35 determines 0 points as the evaluation value of the container 80 having the remaining amount level of "high". The controller 35, when a total evaluation value thus determined is equal to or greater than a predetermined threshold, may display the warning information 113 in the first screen 110 corresponding to this customer group.

Second Screen

Figure 5:
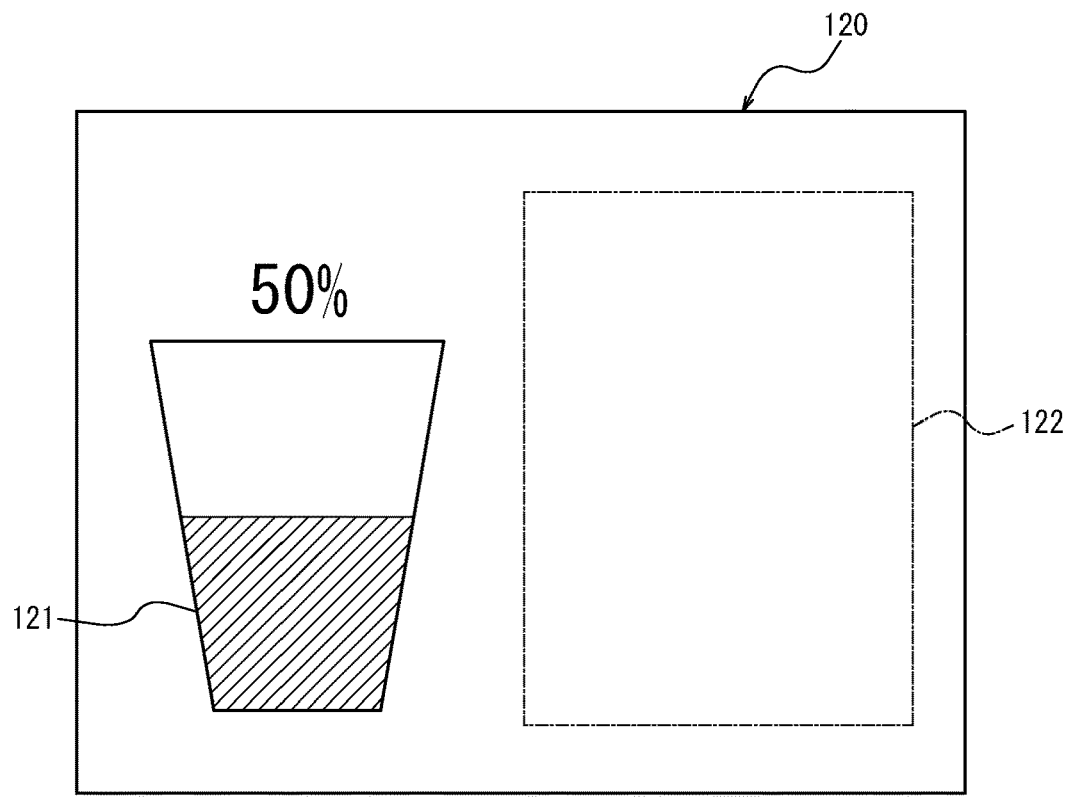
FIG. 5 is a diagram illustrating a second screen displayed in the information presentation apparatus.

The presentation information presented by the information presentation apparatus 30 provided at a customer seat used by a customer group will be described in detail with reference to FIG. 5. The controller 35 of the information presentation apparatus 30 causes the display 32 to display a second screen 120 serving as the presentation information.

An area 121 in the second screen 120 may display a character or a display representing the information indicating the remaining amount of each container 80 having been served to the customer group.

The area 122 in the second screen 120 may display promotional information to promote orders from the customer group. The promotional information may include, for example, a Graphical User Interface (GUI) for receiving an order of food or drink selected by a predetermined algorithm. Any suitable algorithm may be employed for selection of the food or drink. For example, the controller 35 may select the food or drink less frequently or more frequently ordered by the customer group, on the basis of an order history of the customer group.

Any suitable algorithm may be employed for processing to display the promotional information. For example, when the number of containers 80 having the remaining amount level of "empty" out of the containers 80 having been served to the customer group is equal to or greater than the predetermined reference number, the controller 35 may display the promotional information in the second screen 120. Or, when the total evaluation value of the containers 80 having been served to the customer group determined in the above manner is equal to or greater than the predetermined threshold or greater, the controller 35 may display the promotional information in the second screen 120.

Figure 6:
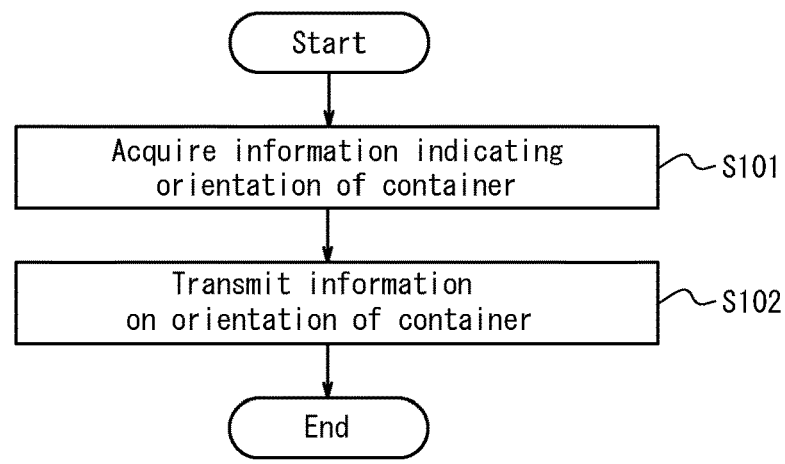
FIG. 6 is a flowchart illustrating a process performed by the container sensor.

A process performed by the container sensor 10 will be described with reference to FIG. 6.

At step S101, the sensor 12 acquires the information indicating the orientation of the container 80.

At step S102, the controller 14 transmits the information indicating the orientation via the communication interface 11.

The processes performed at the above steps S101 and S102 may be repeated until, for example, power of the container sensor 10 is turned off.

Figure 7:
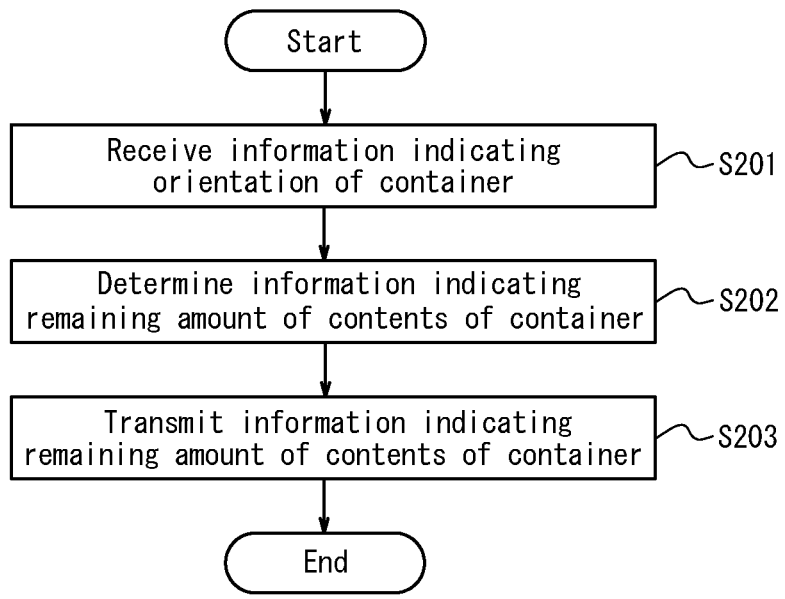
FIG. 7 is a flowchart illustrating a process performed by an information processing apparatus.

A process performed by the information processing apparatus 20 will be described with reference to FIG. 7.

At step S201, the controller 23 receives the information indicating the orientation from the container sensor 10 via the communication interface 21.

At step S202, the controller 23 determines the information indicating the remaining amount of the contents of the container 80 on the basis of the information indicating the orientation.

At step S203, the controller 23 transmits the information indicating the remaining amount to the information presentation apparatus 30 via the communication interface 21.

The processes performed in the above steps S201 to S203 may be repeated until, for example, power of the information processing apparatus 20 is turned off.

Figure 8:
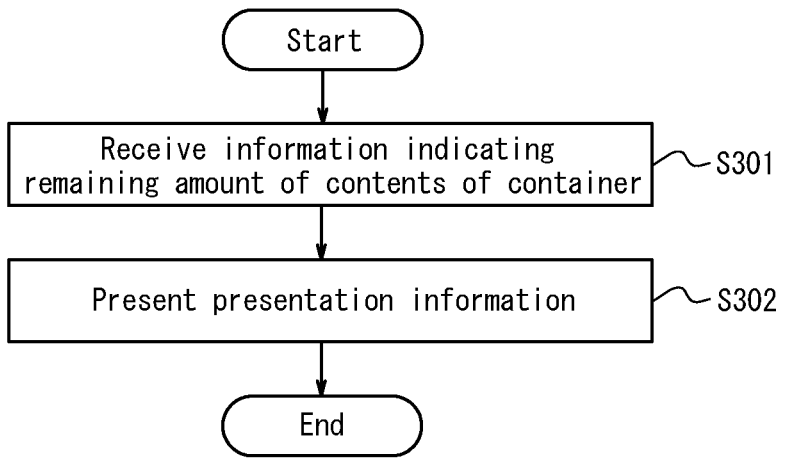
FIG. 8 is a flowchart illustrating a process performed by the information processing apparatus.

A process performed by the information presentation apparatus 30 will be described with reference to FIG. 8.

At step S301, the controller 35 receives the information indicating the remaining amount from the information processing apparatus 20 via the communication interface 31.

At step S302, the controller 35 determines the presentation information based on the information indicating the remaining amount. The controller 35 presents the determined presentation information.

The processes performed in the above steps S301 and S302 may be repeated until, for example, power of the information presentation apparatus 30 is turned off.

As described above, in the information presentation system 1 according to the present embodiment, the container sensor 10 acquires the information indicating the orientation of the container 80. The information processing apparatus 20, based on the information indicating the orientation, determines the information indicating the remaining amount of the contents of the container 80. Then, the information presentation apparatus 30 presents the presentation information on the basis of the information indicating the remaining amount. According to this configuration and as described below, the information presentation system 1 provides enhanced convenience.

For example, when the information presentation system 1 is used for food and drink provision service, even when the container is opaque and the remaining amount is not visible, the waiter/waitress of the dining/drinking place may recognize that the remaining amount of the customer's drink has become low, based on the presentation information presented by the information presentation apparatus 30. Based on the presentation information, the waiter/waitress may, for example, proactively approach the customer to take the customer's order before the customer makes a further drink order. The presentation information enables the waiter/waitress to, for example, recognize the status of the customer's drink without actually looking at the container of the customer's drink. As such, stores using the information presentation system 1 may improve service quality related to the provision of food and drink to customers. Moreover, the information presentation system 1 is also very convenient for the waiter/waitress.

Based on the presentation information, a customer of the dining/drinking place may recognize that the remaining amount of another customer's drink in the same customer group has become low, even when the drink container is opaque and the remaining amount is not visible. The information presentation system 1 enables the customer to easily make a next order of another drink when, for example, the remaining amount of the drink has become low. As such, the information presentation system 1 offers a high level convenience to customers. The information presentation system 1 actively motivates the customer to make a next order of food or drink. As such, the information presentation system 1 is highly convenient to the store.

Figure 9:
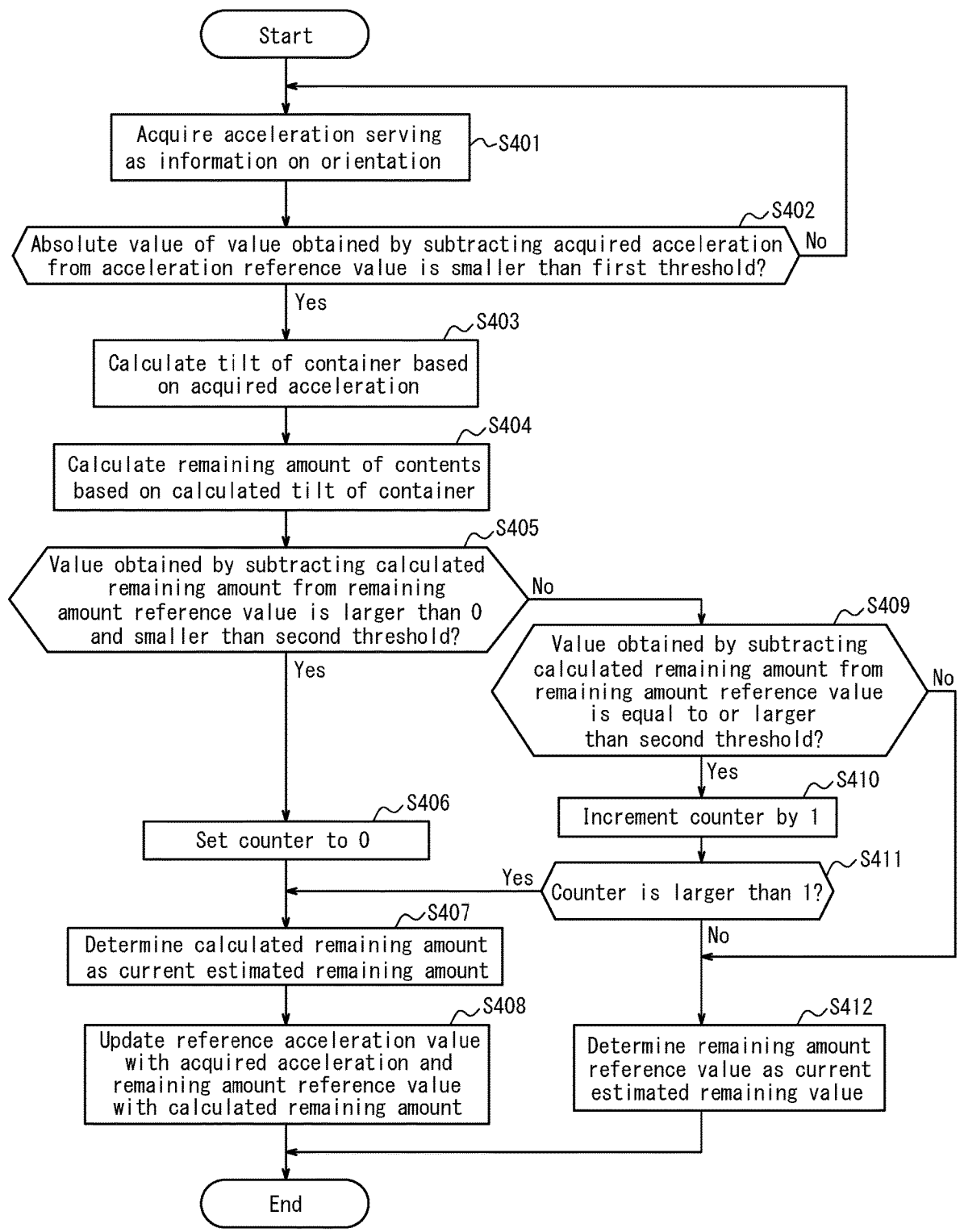
FIG. 9 is a flowchart illustrating an example of a detailed process performed by the information processing apparatus.

An example of the procedure at step S202 performed by the information processing apparatus 20 will be described in detail with reference to FIG. 9. The information processing apparatus 20 may repeat a process illustrated in FIG. 9 at predetermined intervals. For example, the predetermined intervals may be 200 milliseconds.

At step S401, the controller 23 acquires, via the communication interface 11, an acceleration of the container 80 (i.e. an acceleration value), which serves as the information indicating the orientation of the container 80 Hereinafter, the acceleration acquired by the controller 23 may be also referred to as acquired acceleration. The acceleration may be acquired through conversion of the raw data measured by an acceleration sensor serving as the sensor 12 of the container sensor 10 into a physical quantity. The acquired acceleration may be acquired through conversion of the raw data received via the communication interface 11 performed by the controller 23. The acquired acceleration may be acquired through conversion of the raw data performed by the controller 14 of the container sensor 10. The acquired acceleration may include acceleration components (Ax, Ay, and Az) corresponding to three axial directions in a three-dimensional orthogonal coordinate system relative to the container 80.

At step S402, the controller 23 determines whether an absolute value of a value obtained by subtracting the acquired acceleration from an acceleration reference value is smaller than a first threshold. The first threshold corresponds to a second predetermined value. When the absolute value of the value obtained by subtracting the acquired acceleration from the acceleration reference value is smaller than the first threshold (in the case of a "Yes" determination at step S402), the controller 23 determines that the acquired acceleration is a normal value and proceeds to step S403. When the absolute value of the value obtained by subtracting the acquired acceleration from the acceleration reference value is equal to or greater than the first threshold (in the case of a "No" determination at step S402), the controller 23 determines that the acquired acceleration is an abnormal value and returns to step S401. Hereinafter, this determination whether the absolute value is an abnormal value performed at step S402 may also be referred to as abnormal value determination I.

The acceleration reference value is a value updated with the acquired acceleration at step S408 as described below. The absolute value of the value obtained by subtracting the acquired acceleration from the acceleration reference value is an absolute value of a variation amount of the acquired acceleration. The acquired acceleration and the acceleration reference value may be the acceleration component Az in a Z axis direction (vertical direction) of the container 80. Using the acceleration component Az as the acceleration facilitates detection of an impact caused when, for example, the container 80 is placed on the table. Also, when, for example, the raw data includes the acceleration components in the three axial directions, using the acceleration component Az as the acceleration makes the calculation simpler than calculation of overall acceleration. When the acceleration component Az is used as the acceleration, the first threshold value may be, for example, 0.2 G.

At step S403, the controller 23 calculates the tilt of the container 80 based on the acquired acceleration. The tilt of the container 80 is expressed by an angle θ formed by the gravitational vector and the Z axis. The angle θ is expressed, using the acceleration components (Ax, Ay, Az) in the three axial directions of the container 80, by the following formula (1):

[Formula 1]

$$\theta = \tan^{-1}\left(\frac{\sqrt{Ax^2 + Ay^2}}{Az}\right) \quad (1)$$

At step S404, the controller 23 calculates the remaining amount of the contents based on the tilt of the container 80. Hereinafter, a calculated value of the remaining amount may be also referred to as a calculated remaining amount. It is assumed that, for example, a containing portion of the container 80 for containing the contents has a cylindrical shape. It is also assumed that, for example, the contents include fluid. It is also assumed that, for example, the containing portion of the container 80 has a radius R and a height h. A calculated remaining amount V may be calculated separately for a case where a surface of the fluid contents is positioned only on a lateral side of the containing portion of the container 80 and a case where the surface of the fluid is positioned at the bottom of the containing portion of the container 80. In cases where the surface of the fluid is positioned only on the lateral side of the containing portion of the container 80, the calculated remaining amount V may be calculated using the following formula (2):

[Formula 2]

$$V = \pi r^2 (h - r \tan \theta) \quad (2),$$

where $\theta \leq \tan^{-1}(h/2r)$ is satisfied.

In cases where the surface of the fluid is positioned at the bottom of the containing portion of the container 80, the calculated remaining amount V is calculated using the following formula (3):

[Formula 3]

$$V = \frac{2}{3}\frac{h}{r-b}(r^2 - b^2)^{\frac{3}{2}} + \frac{hb}{r-b}\left\{b(r^2-b^2)^{\frac{1}{2}} + r^2\sin^{-1}\left(\frac{b}{r}\right) - \frac{1}{2}\pi r^2\right\}, \quad (3)$$

where $\tan^{-1}(h/2r) < \theta < \pi$ is satisfied.

Here, b is expressed by the formula (4) as follows:

[Formula 4]

$$b = \frac{r\tan\theta - h}{\tan\theta}. \quad (4)$$

When the containing portion of the container 80 has a shape other than the cylindrical shape, the formulas (2) and (3) are each multiplied by a predetermined correction value such that the calculated remaining amount V approximates an actual remaining amount. A shape of the containing portion of the container 80 other than the cylindrical shape may be, for example, a truncated cone shape, where the diameter of the containing portion decreases towards the bottom.

At step S405, the controller 23 determines whether the value obtained by subtracting the calculated remaining amount from a remaining amount reference value is larger than 0 and smaller than a second threshold. The second threshold is the first predetermined value. When the value obtained by subtracting the calculated remaining amount from the remaining amount reference value is greater than 0 and smaller than the second threshold (in the case of a "Yes"

determination at step S405), the controller 23 proceeds to step S406. When the value obtained by subtracting the calculated remaining amount from the remaining amount reference value is equal to or smaller than 0, or greater than the second threshold (in the case of a "No" determination at step S405), the controller 23 determines that the calculated remaining amount may possibly be an abnormal value and proceeds to step S409. Hereinafter, the determination whether the calculated remaining amount is an abnormal value performed at step S405 may also be referred to as abnormal value determination II.

The remaining amount reference value is a value updated with the calculated remaining amount at step S408 as described below. The value obtained by subtracting the calculated remaining amount from the remaining amount reference value is a variation amount (a decrement) of the calculated remaining amount. The second threshold may be, for example, 50 ml.

At step S406, the controller 23 sets a counter to 0. The counter is used for a determination operation performed at step S411 as described below.

At step S407, the controller 23 determines that the calculated remaining amount corresponds to a current estimated remaining amount.

At step S408, the controller 23 updates the acceleration reference value with the acquired acceleration. The controller updates the remaining amount reference value with the calculated remaining amount.

At step S409, the controller 23 determines whether the value obtained by subtracting the calculated remaining amount from the remaining amount reference value is equal to or greater than the second threshold. When the value obtained by subtracting the calculated remaining amount from the remaining amount reference value is equal to or greater than the second threshold (in the case of a "Yes" determination at step S409), the controller 23 proceeds to step S410. When the value obtained by subtracting the calculated remaining amount from the remaining amount reference value is 0 or smaller (in the case of a "No" determination at step S409), the controller 23 determines that the calculated remaining amount is an abnormal value and proceeds to step S412. Hereinafter, this determination whether the calculated remaining amount is an abnormal value performed at step S409 may also be referred to as abnormal value determination III.

At step S410, the controller 23 increments the counter by 1.

At step S411, the controller 23 determines whether the counter is greater than 1. When the counter is greater than 1 (in the case of a "Yes" determination at step S411), the controller 23 determines that the calculated remaining amount is a normal value and proceeds to step S407. When the counter is 1 or smaller (in the case of a "No" determination at step S411), the controller 23 determines that the calculated remaining amount is an abnormal value and proceeds to step S412. Hereinafter, this determination whether the calculated remaining amount is an abnormal value performed at step S411 may also be referred to as abnormal value determination IV.

At step S412, the controller 23 determines that the remaining amount reference value corresponds to the current estimated remaining value.

As described above, when the calculated remaining amount decreases by the first predetermined value or more in the predetermined time period, the information processing apparatus 20, according to some embodiments, does not perform the determination on the estimated value on the basis of the calculated remaining value. This configuration enables, when the calculated remaining value is an abnormal value, the information processing apparatus 20 to eliminate the abnormal value from the determination on the estimated remaining amount. Thus, the convenience of a technique for obtaining information indicating the remaining amount of contents may be improved.

When the acceleration varies by the second predetermined value or more in the predetermined time period, the information processing apparatus 20 according to some embodiments does not perform the determination of the estimated value of the remaining amount on the basis of the acceleration. This configuration enables, when the acceleration serving as the information indicating the orientation is an abnormal value, the information processing apparatus 20 to eliminate the abnormal value before calculating the remaining amount.

When the acceleration varies by the second predetermined value or more in the predetermined time period, the information processing apparatus 20 according to one embodiment refrains from performing the determination of the calculated value of the remaining amount on the basis of the acceleration. This configuration enables the information processing apparatus 20 to eliminate the abnormal value before calculating the remaining amount.

When the calculated value of the remaining amount decreases by the first predetermined value or more over the predetermined time period, the information processing apparatus 20 according to some embodiments determines the estimated value based on the calculated value. When, for example, the contents of the container 80 sharply decreases as the container 80 is overturned and maintains such a reduced amount over the predetermined time period, this configuration enables the information processing apparatus 20 to use the calculated value as a normal value for the determination of the estimated value.

When the calculated remaining amount increases, the information processing apparatus 20 according to one embodiment does not perform the determination of the estimated value on the basis of the calculated value. When, for example, the container 80 once tilted is put upright, this configuration enables the information processing apparatus 20 to prevent the estimated remaining amount from increasing again.

The following is a description of results of experiments in which the information processing apparatus 20 is operated according to the process described above referring to FIG. 9.

Figure 10:
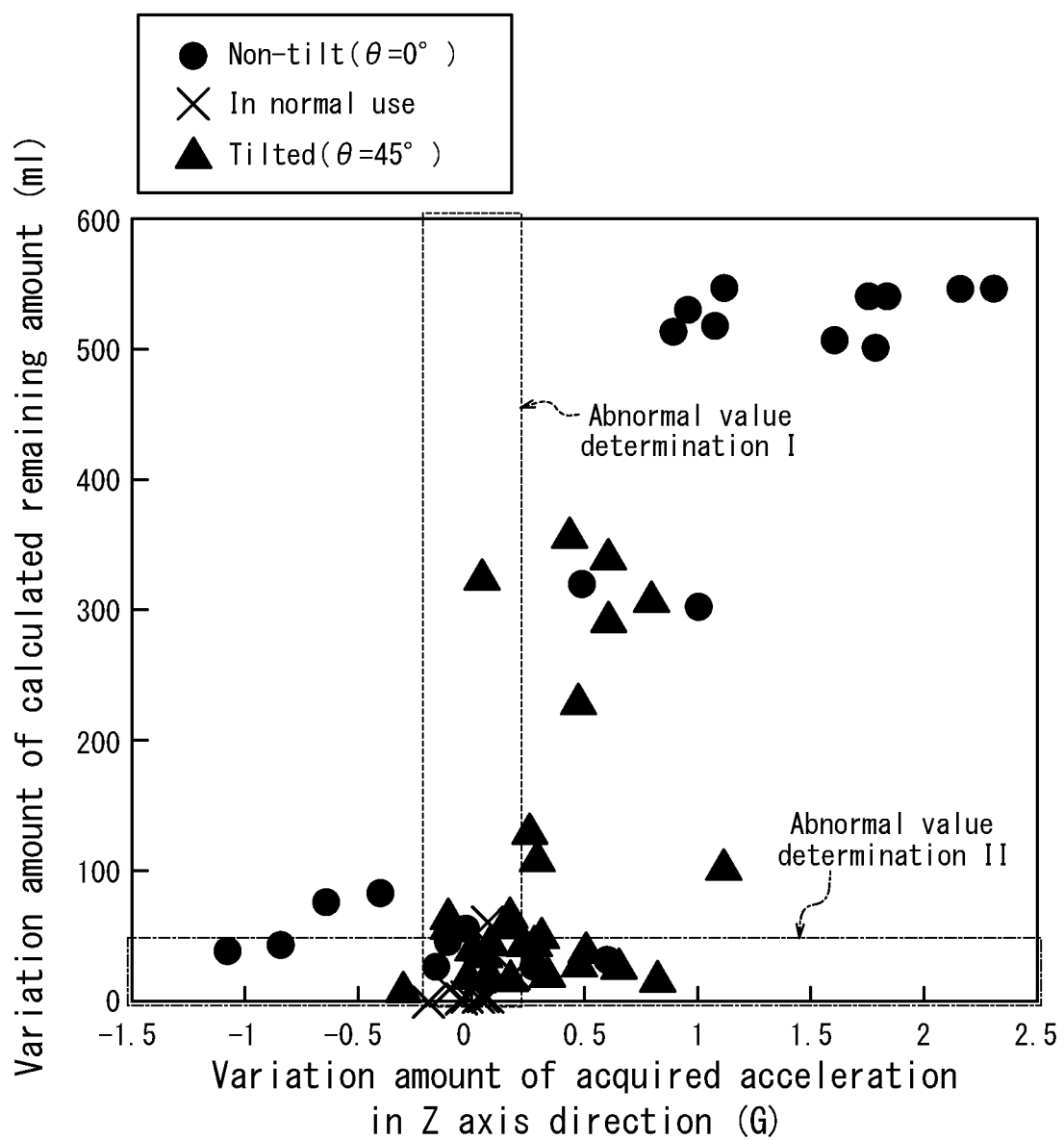
FIG. 10 is a graph illustrating results of experiments in which the information processing apparatus is operated following the process illustrated in FIG. 9.

The acceleration was acquired when an external impact was applied to the container 80 with no tilt ($\theta=0°$). Also, the acceleration was acquired when an external impact was applied to the container 80 with a tilt ($\theta=45°$). Further, the acceleration of the container 80 in normal use was acquired. The container 80 in normal use means the container 80 being used without having a sudden impact applied thereto but moved to an extent assumed to be normal use. FIG. 10 illustrates a correspondence under each condition between a variation amount of acquired acceleration in the Z axis direction of the container 80 and a variation amount of the calculated remaining amount.

As illustrated in FIG. 10, during the normal movement an absolute value of the variation amount of the acquired acceleration in the Z axis direction was less than 0.2 G. Based on this result, the first threshold of the abnormal value determination I may be set to 0.2 G. During the normal movement the variation amount of the calculated remaining amount was 0 to 50 ml. Based on this result, the second threshold of the abnormal value determination II may be set to 50 ml. Using a combination of the abnormal value determination I and the abnormal value determination II in this manner enables accurate discrimination between a normal value and an abnormal value. In this way, the controller 23 may accurately determine the remaining amount of the contents of the container 80.

The controller 23 of the information processing apparatus 20 may determine the calculated remaining amount as the estimated remaining amount after the elapse of predetermined delay time. For example, the controller 23, at the procedure of step S407 of FIG. 9, may determine the calculated remaining amount as the estimated remaining amount after the elapse of the predetermined delay time, instead of as the current estimated remaining amount. In proportion to a decrease in the calculated remaining amount, a difference between the calculated remaining amount and the estimated remaining amount at the same time becomes greater. Hereinafter, the difference between the calculated remaining amount and the estimated remaining amount at the same time may be also referred to as a correction amount. The smaller the decrease in the calculated remaining amount, the smaller the correction amount. When, for example, the customer brings his/her lips into contact with an upper edge of the container 80 to drink the contents, the correction amount may correspond to an amount of the contents temporarily blocked by the lips. The correction amount may have a predetermined upper limit. The upper limit of the correction amount may vary in accordance with the calculated remaining amount. This enables to correspond to a change in the amount of the contents temporarily blocked by the lips in accordance with the tilt of the container 80. In proportion to the decrease in the calculated remaining amount, a reducing speed of the correction amount may accelerate more. This enables to correspond to that the difference between the calculated remaining amount and the estimated remaining amount becomes smaller as the tilt of the container 80 is greater and the customer drinks the contents in a more vigorous manner. The controller 23 reduces the upper limit of the correction amount more as the calculated remaining amount is greater. This is because, when the calculated remaining amount is greater, the remaining amount of the contents per unit tilt of the container 80 is smaller. When the container 80 is put upright (considered as non-tilt) before the elapse of the predetermined delay time, the controller 23 refrains from updating the remaining amount reference value with the calculated remaining amount. When the container 80 continues to be tilted until the predetermined delay time has elapsed, the controller 23 may update the remaining amount reference value with the calculated remaining amount after the elapse of the predetermined delay time.

The controller 23 of the information processing apparatus 20 may correct the estimated remaining amount based on a change in the tilt of the container 80. Normally, the user quickly tilts the container until the contents reaches the user's lips and then slowly tilts to start drinking. When the user tilts the container slowly before the tilt of the container reaches a tilt corresponding to the expected remaining amount, the controller 23 assumes that the estimated remaining amount is too much and corrects appropriately. Correction of the estimated remaining amount in this manner enables elimination of abnormal values which are not discriminated by the abnormal value determination I to IV.

The controller 23 of the information processing apparatus 20, based on a speed of a change in the calculated tilt of the container 80, may classify a consumption tendency of a customer who is using the container 80. The "consumption tendency" may be restated as the speed at which the contents are being drunk. For example, the greater the rate of change of the calculated tilt of the container 80, the higher the classification of the consumption tendency. The controller 23, based on a calculated duration of the tilt of the container 80, may classify the consumption tendency of the customer who is using the container 80. For example, when the calculated tilt of the container 80 exceeds 90 degrees for at least a predetermined time period, the controller 23 may determine that the customer is trying to finish the contents in a short time period and classify the consumption tendency of the customer as extremely high. The controller 23 may transmit information indicating the classified consumption tendency, together with the ID information of the container sensor 10, to the information presentation apparatus 30 via the communication interface 21. The controller 35 of the information presentation apparatus 30 may determine the presentation information based on the received consumption tendency. For example, when the consumption tendency is equal to or greater than a predetermined value, or equal to or less than another predetermined value, the controller 35 may display the presentation information in the first screen 110 indicating that the waiter/waitress should preferentially take an order from the customer using a corresponding container 80 (see FIG. 4). In this way, for example, a customer with a high consumption tendency is prompted to make an order before emptying the container 80, therefore reducing time in which the container 80 remains empty. For example, a customer with a low consumption tendency is prompted to make a new order, thus the new order for another type drink may be taken to replace a current drink.

The controller 23 of the information processing apparatus 20 may estimate, based on the tilt or the acquired acceleration, a drinking process of the customer who is using the container 80. For example, when the customer swallows the contents of the container 80, the customer moves his/her throat and so on. Therefore, the controller 23 of the information processing apparatus 20 may estimate a timing at which the customer drinks the contents based on the change in the calculated tilt of the container 80. This minute change in the tilt corresponds to the movement of the throat and so on when the customer swallows the contents. The controller 23 of the information processing apparatus 20 may estimate the timing at which the customer drinks the contents based on variations in the calculated acceleration components of at least one of Ax and Ay for the container 80. A minute variation of the acceleration component corresponds to the movement of the throat and so on when the customer swallows the contents. The controller 23 may change the estimated remaining amount of the contents in accordance with the estimated timing at which the customer swallows. In this way, the controller 23 may estimate the change in the remaining amount of the container 80 in detail. The controller 23 may reduce the estimated remaining amount, based on an acquired angle or a magnitude of the variation of the acquired acceleration when the customer swallows the contents. For example, the controller 23 relatively decreases the remaining amount when the tilt or the variation of the acquired acceleration is great and relatively reduces the remaining amount when the tilt or the variation of the acquired acceleration is small. The controller 23 may classify the consumption tendency of the customer who is using the container 80 based on the calculated tilt or the variation of the acquired acceleration of the container 80. For example, when the calculated tilt or the acquired acceleration of the container 80 is great, the controller 23 may classify the consumption tendency as high consumption tendency. On the other hand, for example, when the calculated tilt or the acquired acceleration of the container 80 is small, the controller 23 may classify the consumption tendency as low consumption tendency.

When the acceleration sensor is employed as the sensor 12 of the container 80, the information indicating the orientation of the container 80 transmitted to the information processing apparatus 20 by the container sensor 10 may include, in addition to the tilt, information indicating various movements in a three-dimensional space, such as translation and rotational motion. This information enables the controller 23 of the information processing apparatus 20 to know the movements of the customer in more detail. For example, the controller 23 of the information processing apparatus 20, based on a change in the range of the calculated tilt of the container 80, may determine a degree of drunkenness of the customer who is using the container 80. For example, when the change in the range is greater than a predetermined value, the controller 23 may determine that the degree of drunkenness is high (i.e. getting drunk). The controller 23 may transmit information indicating the degree of drunkenness thus determined, together with the ID information of the container sensor 10, to the information presentation apparatus 30 via the communication interface 21. The controller 35 of the information presentation apparatus 30 may determine the presentation information based on the information about the degree of drunkenness. For example, when the degree of drunkenness is equal to or over the predetermined value, the controller 35 may refrain from displaying presentation information which promotes an additional order.

The controller 23 of the information processing apparatus 20, based on the acquired acceleration, may determine a behavior of the customer who is using the container 80. For example, the controller 23, based on the acceleration, determines that the bottom of the container 80 is circling in a horizontal plane. Such behavior of the customer is likely to be the customer's habit. In this case, the controller 23 does not need to take any action. For example, the controller 23, based on the acquired acceleration, determines that the bottom of the container 80 is moving like a pendulum which reciprocates on a single locus. Such a movement is likely to occur when the customer wants to know the remaining amount of the contents. In this case, the controller 23 may transmit a remaining amount display instruction, together with the ID information of the container sensor 10, to the information presentation apparatus 30. The controller 35 of the information presentation apparatus 30 may determine, based on the received remaining amount display instruction, information to indicate the remaining amount of the contents of the container 80 as presentation information. For example, the controller 35 may display the remaining amount of the contents of the container 80 in the second screen 120 (see FIG. 5). In this way, even when it is difficult to see the remaining amount of the contents through the container 80, the customer may be informed of the remaining amount of the contents. When the remaining amount of the contents is equal to or less than a predetermined value, a screen to promote an additional order may be displayed in the second screen 120. When some containers 80 in the same customer group have a large remaining amount of contents, information indicating the presence of such containers 80 with the large remaining amount may be displayed. When there is another container 80 in the same customer group which has a remaining amount equal to or less than the predetermined value, a screen to promote an additional order for this container 80 may be displayed in the second screen 120.

When the acquired acceleration does not vary for a predetermined time period or longer, the controller 23 of the information processing apparatus 20 may determine that the container 80 has been neglected. In this respect, the predetermined time period for which the acquired acceleration does not vary includes the scenario where the acquired acceleration does not exceed the predetermined value for the predetermined time period or longer. This predetermined value may be determined with consideration to a noise level of the sensor 12 and a vibration of a table when the container 80 is placed. When determining that the container 80 has been neglected, the controller 23 may generate neglect-determination information. The controller 23 may transmit the neglect-determination information, together with the ID information of the container sensor 10, to the information presentation apparatus 30. The controller 35 of the information presentation apparatus 30, based on the neglect-determination information received, may display, in the first screen 110, an instruction to collect the container 80 that has been neglected. The controller 23 or the controller 35 may transmit the neglect-determination information to the container sensor 10. The container sensor 10 may have a lighting function. Upon receiving the neglect-determination information, the container sensor 10 may execute the lighting function.

When the calculated tilt of the container 80 sharply increases from 0 degrees to 90 degrees or greater, and is maintained at 90 degrees or greater for a predetermined time period, the controller 23 of the information processing apparatus 20 may determine that the container 80 is overturned. When determining that the container 80 is overturned, the controller 23 may generate overturn information. The controller 23 may transmit the overturn information, together with the ID information of the container sensor 10, to the information presentation apparatus 30. The controller 35 of the information presentation apparatus 30, based on the overturn information received, may display, in the first screen 110, an instruction to clean around the container 80 that has been overturned. Even when the estimated remaining amount of the contents of the container 80 is already 0, the controller 23 may generate the overturn information upon determination as described above. In this way, when, for example, the contents includes non-drinkable items such as ice cubes and straws, the information processing apparatus 20 may handle the non-drinkable items spilt from the container 80 that has been overturned. The non-drinkable items also include water from melting ice cubes.

The controller 23 of the information processing apparatus 20 may transmit the acquired acceleration, together with the ID information of the container sensor 10, to the information presentation apparatus 30. The controller 35 of the information presentation apparatus 30, based on accelerations of a plurality of the container sensors 10 in the same customer group, may determine a state of the customer group. For example, when at least a predetermined number of the container sensors 10 in the same customer group are in a state other than a stationary state and are simultaneously, experiencing small acceleration variations, the controller 35 may determine that the customer group is in a state immediately before toasting. When the accelerations of at least the predetermined number of the container sensors 10 in the same customer group concurrently rise to equal or exceed a predetermined threshold, the controller 35 may determine that the customer group is toasting. The controller 35 may determine the presentation information based on the determined state of the customer group. For example, immediately before the toast, the controller 35 may present information to indicate that the waiter/waitress should service the group sparingly. After the toast, the controller 35 may present information to indicate that the waiter/waitress should start servicing the group by, for example, providing dishes and playing music in the room.

Although the disclosure has been described based on the figures and the embodiment, it is to be understood that various modifications and changes may be implemented based on the disclosure by those who are ordinarily skilled in the art. Accordingly, such modifications and changes are included in the scope of the disclosure. For example, functions and the like included in each means or step may be rearranged without logical inconsistency, so as to combine a plurality of means or steps together or to separate them.

For example, the above embodiments have been described in terms of examples wherein the information presentation system 1 is used for servicing food and drink. However, use of the information presentation system 1 is not limited to such embodiments. The information presentation system 1 may be used by, for example, an individual user. In this case, the user may attach the container sensor 10 to the container 80 and place the container in a particular location. The container 80 may be placed in, for example, the user's home or a restaurant the user has previously visited. The user, being away from where the container 80 is stored, may check information indicating the remaining amount of the contents of the container 80, using the information presentation apparatus 30.

Figure 12:
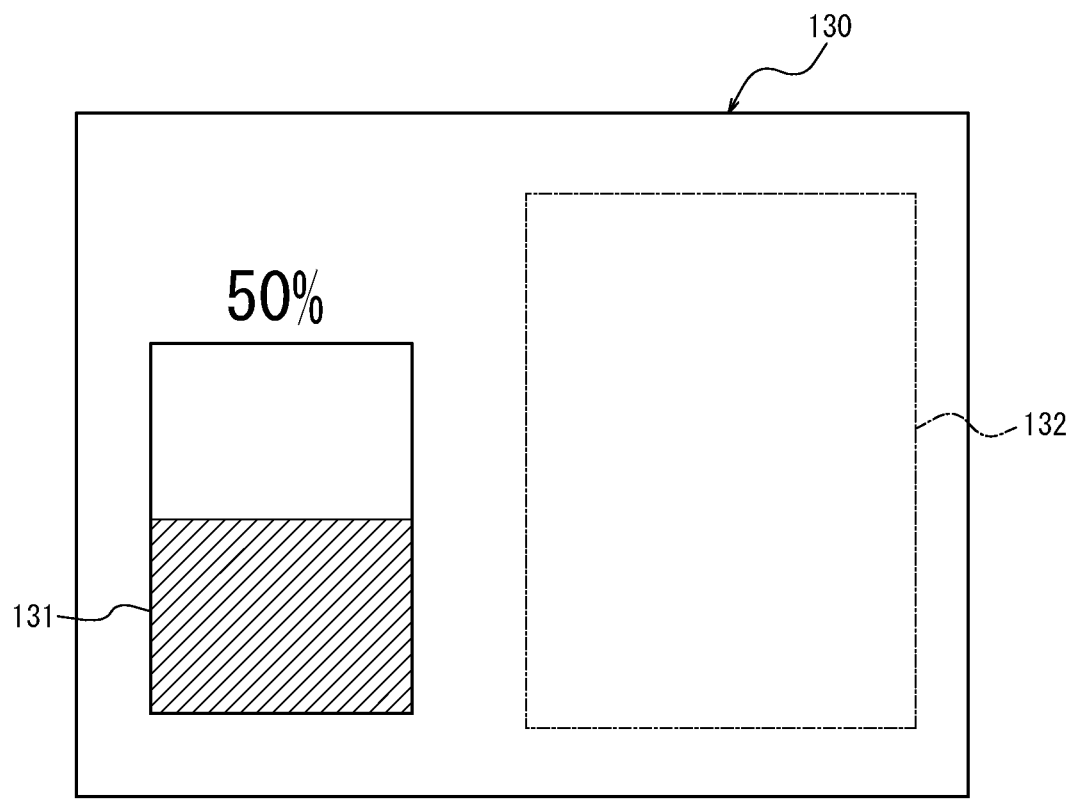
FIG. 12 is a diagram illustrating a third screen displayed in the information presentation apparatus according to an example variation of the embodiment.

In this usage mode, the information presentation apparatus 30 may be, for example, an apparatus such as a smartphone or a PC owned by the user. The presentation information presented by this information presentation apparatus 30 will be described in detail with reference to FIG. 12. The controller 35 of the information presentation apparatus 30 displays, as presentation information, a third screen 130 in the display 32. An area 131 of the third screen 130 may display information, represented by a character or an image, indicating the remaining amount of each container 80 which has a container sensor 10 attached thereto. An article area 131 of the third screen 130 may display any information associated with the contents of the container 80. The information associated with the contents may include, for example, a name of the contents, opening date and time, a storage place, a manufacturer's name, a change in a storage state over time, a last day when a remaining amount changed, the number of days left until the contents are to be discarded, and a price. Some or all of the information associated with the contents may be input to the information presentation apparatus 30 by a user operation. Some or all of the information associated with the contents may be acquired via, for example, the network 50.

The above embodiments describe configurations in which the container sensor 10 is fitted to the bottom of the container 80 via the attaching portion 15. However, configuration of the attaching portion 15 is not limited to the above embodiments. For example, an attaching portion 15a of a container sensor 10a illustrated in FIG. 11 may have a belt shape or a band shape. The container sensor 10a is fixed on a lateral side of the container via the attaching portion 15a. This configuration enables the container sensor 10a to be commonly used for various containers 80 with different shapes. In this way, the information presentation system 1 can provide further convenience.

Figure 11:
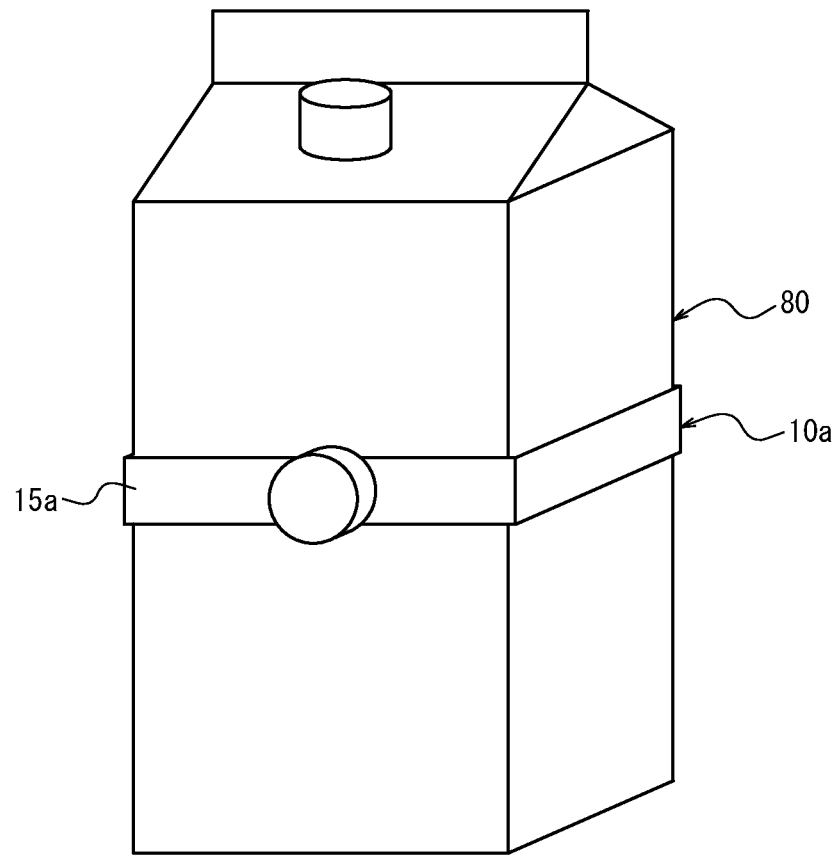
FIG. 11 is a diagram illustrating a state in which a container sensor according to an example variation of the embodiment is attached to a container.

The container sensor 10, as illustrated in FIG. 11, for example, may be attached to the container 80 of a dining/drinking place via the attaching portion 15. The waiter/waitress of the dining/drinking place tilts the container when pouring drink into a customer's container. The information presentation apparatus 30 may present the contents of a stored container of the dining/drinking place. The information presentation apparatus 30 may display an order screen for new food and drink corresponding to a container with a small remaining amount. The information presentation system 1 is highly convenient for a store that manages inventory. The information presentation system 1 may actively motivate the store to make an order of next food or drink. The information presentation system 1 is highly convenient for a liquor store that sells food and drink to the store.

Figure 13:
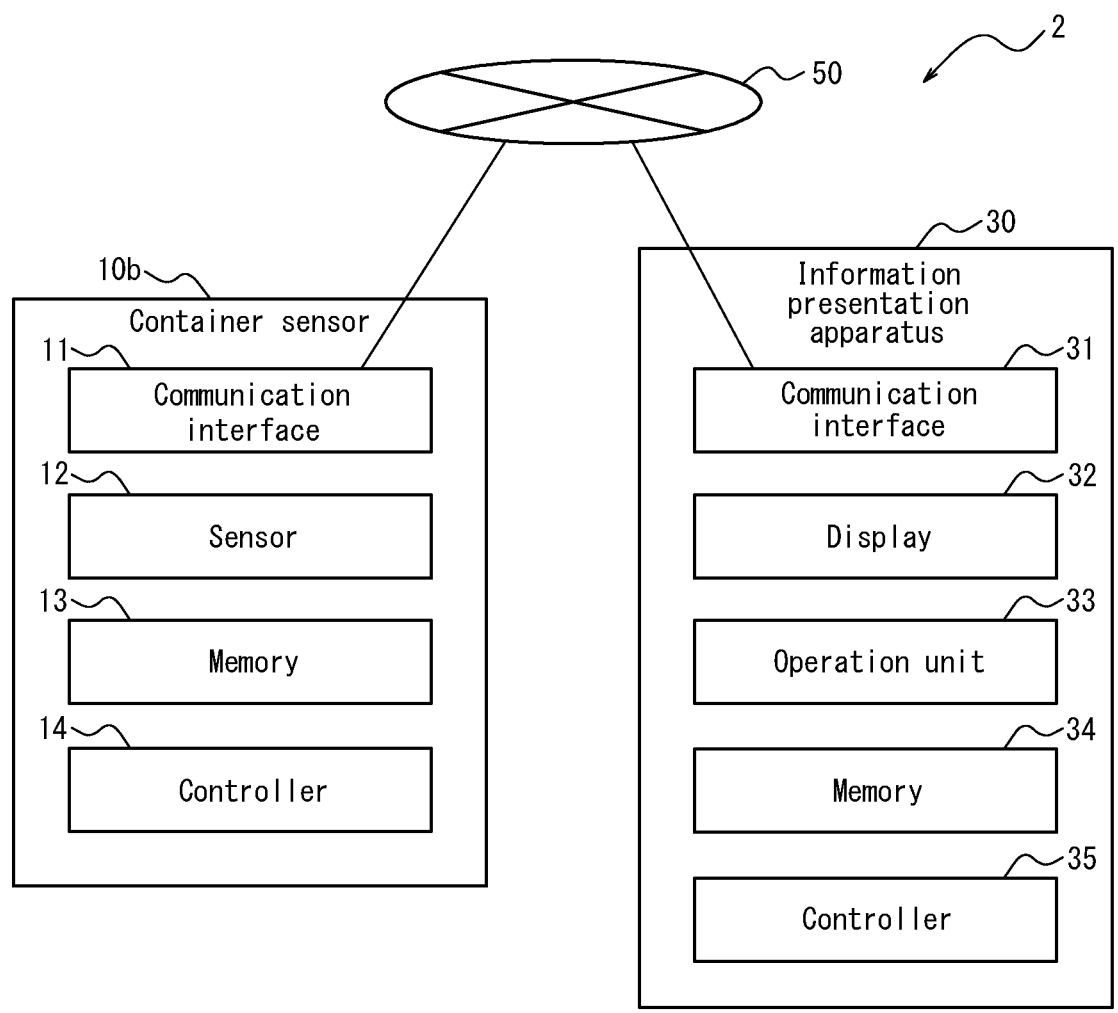
FIG. 13 is a block diagram illustrating a schematic configuration of an information presentation system according to the example variation of the embodiment.

In the above embodiments, some or all of the elements and functions of the information presentation system 1 may be included in another element. For example, some or all of the elements and functions of the information processing apparatus 20 may be included in the container sensor 10 or the information presentation apparatus 30. In this case, an information presentation system 2, as illustrated in FIG. 13, may include a container sensor 10b and the information presentation apparatus 30. For example, a controller 14 of the container sensor 10b may determine the information indicating the remaining amount of the contents of the container 80 based on the information indicating the orientation of the container 80. The controller 14 externally transmits the information indicating the remaining amount determined. Alternatively, the controller 35 of the information presentation apparatus 30 may determine the information indicating the remaining amount of the contents of the container 80 based on the information indicating the orientation received from the container sensor 10.

In the above embodiments, a configuration has been described in which the display 32 of the information presentation apparatus 30 displays the first screen 110, the second screen 120, and the third screen 130, which serve as the presentation information. As described above, however, the process to present the information may include, for example, a process to display the information on a screen and also a process for generating an audio output of the information. Therefore, the information presentation apparatus 30 may include, for example, an audio output unit configured to generate an audio output of the presentation information. The audio output unit may include, for example, a speaker. Components including the display 32 and the audio output unit which are used to present the presentation information are also referred to as an information presentation unit.

The "first" and the "second" used herein are identifiers used for distinguishing components. The identifiers of the components distinguished by the "first" and the "second" used herein are interchangeable. For example, between the first ID information and the second ID information, the "first" and the "second" are interchangeable. The interchange of the identifiers concurs with each other. After the interchange of the identifiers, the components are distinguished from each other. The identifiers may be removed. The components from which the identifiers are removed are distinguished by reference signs. The identifiers may be added. For example, the controller 14, the controller 23, and the controller 35 may be changed to a first controller 14, a second controller 23, and a third controller 35, respectively. No interpretation of an order in the configuration or no assumption of the presence of an identifier with a smaller number should be made using the identifiers such as the "first" and the "second" used herein alone.

The following clauses correspond to the claims disclosed in Japanese patent application JP-A-2016-208180, from which the present application claims priority.

[1] A sensor container comprising:
a container;
a sensor configured to acquire information indicating an orientation of the container;
a controller configured to determine, based on the information indicating the orientation of the container, information indicating a remaining amount of contents of the container; and
a communication interface configured to externally transmit the information indicating the remaining amount.

[2] The sensor container according to clause [1],
wherein the sensor acquires, as the information indicating the orientation of the container, information indicating a tilt of the container, and
the controller, based on the information indicating the tilt of the container, determines the information indicating the remaining amount of the contents of the container.

[3] A container sensor comprising:
an attaching portion attachable to a container;
a sensor configured to acquire information indicating an orientation of the container;
a controller configured to determine, based on the information indicating the orientation of the container, information indicating a remaining amount of contents of the container; and
a communication interface configured to externally transmit the information indicating the remaining amount.

[4] The container sensor according to clause [3],
wherein the sensor acquires, as the information indicating the orientation of the container, information indicating a tilt of the container, and
the controller, based on the information indicating the tilt of the container, determines the information indicating the remaining amount of the contents of the container.

[5] The container sensor according to clause [4],
further comprising a memory configured to store correspondence information indicating a correspondence between the information indicating the orientation of the container and the information indicating the remaining amount of the contents of the container,
wherein the controller, based on the correspondence information, determines the information indicating the remaining amount of the contents of the container corresponding to the information indicating the tilt of the container.

[6] An information presentation apparatus comprising:
a communication interface configured to receive information indicating a remaining amount of contents of a container;
a controller configured to determine presentation information based on the information indicating the remaining amount; and
an information presentation unit configured to present the presentation information.

[7] The information presentation apparatus according to clause [6],
wherein the communication interface receives the information indicating the remaining amount from each of a plurality of sensor containers, and
the controller determines the presentation information based on the plurality of information indicating the remaining amount.

[8] A program for causing a container sensor to execute:
acquisition of information indicating an orientation of a container;
determination of information indicating a remaining amount of contents of the container based on the information indicating the orientation of the container; and
externally transmitting the information indicating the remaining amount.

[9] An information presentation system comprising:
a container sensor to be attached to a container and an information presentation apparatus,
wherein the container sensor acquires information indicating an orientation of the container, determines information indicating a remaining amount of contents of the container based on the information indicating the orientation of the container, and then transmits the information indicating the remaining amount to the information presentation apparatus, and
the information presentation apparatus presents the presentation information on the basis of the information indicating the remaining amount.

The following clauses correspond to the claims disclosed in Japanese patent application JP-A-2016-208181, from which the present application claims priority.

[1] An information processing apparatus comprising:
a communication interface configured to receive information indicating an orientation from a sensor container; and
a controller configured to determine information indicating a remaining amount of contents of the sensor container based on the information indicating the orientation,
wherein the communication interface externally transmits the information indicating the remaining amount.

[2] The information processing apparatus according to clause [1],
wherein the communication interface receives information indicating a tilt serving as the information indicating the orientation, and
the controller determines the information indicating the remaining amount based on the information indicating the tilt.

[3] The information processing apparatus according to clause [2],
further comprising a memory configured to store correspondence information indicating a correspondence between the information indicating the tilt and the information indicating the remaining amount,
wherein the controller determines, based on the correspondence information, the information indicating the remaining amount corresponding to the information indicating the tilt.

[4] An information presentation apparatus comprising:
a communication interface configured to receive information indicating a remaining amount of contents of a container from an information processing apparatus;
a controller configured to determine presentation information based on the information indicating the remaining amount; and
an information presentation unit configured to present the presentation information.

[5] The information presentation apparatus according to clause [4],
wherein the communication interface receives a plurality of the information indicating the remaining amount, and
the controller determines the presentation information based on the plurality of information indicating the remaining amount.

[6] An information presentation system comprising:
a sensor container, an information processing apparatus, and an information presentation apparatus,
wherein
(1) the sensor container includes:
a container;
a sensor configured to acquire information indicating an orientation of the container; and
a first communication interface configured to externally transmit the information indicating the orientation of the container,
(2) the information processing apparatus includes:
a second communication interface configured to receive the information indicating the orientation from the sensor container; and
a first controller configured to determine, based on the information indicating the orientation of the sensor container, information indicating a remaining amount of contents of the sensor container,
wherein the second communication interface externally transmits the information indicating the remaining amount, and
(3) the information presentation apparatus includes:
a third communication interface configured to receive the information indicating the remaining amount from the information processing apparatus;
a second controller configured to determine presentation information based on the information indicating the remaining amount; and
an information presentation unit configured to present the presentation information.

[7] The information presentation system according to clause [6],
wherein the sensor acquires information indicating a tilt of the container serving as the information indicating the orientation of the container.

[8] A program for causing an information processing apparatus to execute:
reception of information indicating an orientation of a container;
determination of information indicating a remaining amount of contents of the container based on the information indicating the orientation of the container; and
external transmission of the information indicating the remaining amount.

[9] An information presentation system comprising:
a sensor container having a container, an information processing apparatus, and an information presentation apparatus,
wherein the sensor container acquires information indicating an orientation of the container and transmits the information indicating the orientation to the information processing apparatus,
the information processing apparatus determines information indicating a remaining amount of contents of the container based on the information indicating the orientation of the container and transmits the information indicating the remaining amount to the information presentation apparatus, and
the information presentation apparatus presents the presentation information on the basis of the information indicating the remaining amount.

The following clauses correspond to the claims disclosed in Japanese patent application JP-A-2016-208182, from which the present application claims priority.

[1] An information presentation apparatus comprising:
a communication interface configured to receive information indicating an orientation from a sensor container;
a controller configured to determine information indicating a remaining amount of contents of the sensor container based on the information indicating the orientation of the sensor container and to determine presentation information based on the information indicating the remaining amount; and
an information presentation unit configured to present the presentation information.

[2] The information presentation apparatus according to clause [1],
wherein the communication interface receives information indicating a tilt of the container serving as the information indicating the orientation, and
the controller determines information indicating a remaining amount based on the information indicating the tilt.

[3] The information presentation apparatus according to clause [2],
further comprising a memory configured to store correspondence information indicating a correspondence between the information indicating the tilt and the information indicating the remaining amount,
wherein the controller determines, based on the correspondence information, the information indicating the remaining amount corresponding to the information indicating the tilt.

[4] An information presentation apparatus according to clause [1] or clause [2],
wherein the communication interface receives the information indicating the remaining mount from each of a plurality of sensor containers, and
the controller determines the presentation information based on the plurality of information indicating the remaining amount.

[5] An information presentation system comprising:
a sensor container and an information presentation apparatus,
wherein
(1) the sensor container includes:
a container;
a sensor configured to acquire information indicating an orientation of the container; and
a first communication interface configured to externally transmit the information indicating the orientation of the container, and
(2) the information presentation apparatus includes:
a communication interface configured to receive the information indicating the orientation from the sensor container;
a controller configured to determine information indicating a remaining amount of contents of the sensor container based on the information indicating the orientation of the sensor container and to determine presentation information based on the information indicating the remaining amount; and
an information presentation unit configured to present the presentation information.

[6] The information presentation system according to clause [5],
wherein the sensor acquires information indicating a tilt serving as the information indicating the orientation.

[7] A program for causing an information presentation apparatus to execute:
reception of information indicating an orientation of a container;

determination of information indicating a remaining amount of contents of the container based on the information indicating the orientation of the container; and a process to present presentation information on the basis of the information indicating the remaining amount.

[8] An information presentation system comprising:

a sensor container having a container and an information presentation apparatus connected to each other via a network, wherein the sensor container acquires information indicating an orientation of the container and transmits the information indicating the orientation of the container to the information presentation apparatus, and the information presentation apparatus determines information indicating a remaining amount of contents of the container based on the information indicating the orientation of the container and presents presentation information indicating the basis of the information indicating the remaining amount.

The invention claimed is:

1. An information processing apparatus comprising:
a communication interface configured to receive, from a sensor container, information indicating an orientation of the sensor container; and
a controller configured to calculate, based on the information indicating the orientation of the sensor container, a calculated value indicating a remaining amount of contents of the sensor container and to determine an estimated value indicating the remaining amount on the basis of the calculated value,
wherein the communication interface transmits the estimated value indicating the remaining amount to an external device, wherein the external device presents the estimated value indicating the remaining amount, and
when the calculated value indicating the remaining amount decreases by a first predetermined value or more within a predetermined time period, the controller does not perform the determination of the estimated value on the basis of the calculated value.

2. The information processing apparatus according to claim 1,
wherein the communication interface receives an acceleration value serving as the information indicating the orientation of the sensor container, and
when the acceleration value varies by a second predetermined value or more within the predetermined time period, the controller does not perform the calculation of the calculated value indicating the remaining amount on the basis of the acceleration.

3. The information processing apparatus according to claim 1,
wherein when the decrease of the calculated value indicating the remaining amount by the first predetermined value or more continues beyond the predetermined time period, the controller determines the estimated value on the basis of the calculated value.

4. The information processing apparatus according to claim 1,
wherein when the calculated value indicating the remaining amount increases, the controller does not perform the determination of the estimated value on the basis of the calculated value.

5. The information processing apparatus according to claim 1,
wherein the controller corrects the estimated value indicating the remaining amount on the basis of a temporal change in a decrease in the calculated value indicating the remaining amount.

6. The information processing apparatus according to claim 1,
wherein the controller uses the calculated value indicating the remaining amount for determination of the estimated value indicating the remaining amount after a predetermined delay time has elapsed.

7. An information presentation system comprising:
a sensor container which includes a container, a sensor configured to acquire information indicating an orientation of the container, and a first communication interface configured to externally transmit the information indicating the orientation of the container;
an information processing apparatus which includes a second communication interface configured to receive the information indicating the orientation of the sensor container from the sensor container, and a first controller configured to calculate, based on the information indicating the orientation of the sensor container, a calculated value indicating a remaining amount of contents of the sensor container and to determine, based on the calculated value, an estimated value indicating the remaining amount; and
an information presentation apparatus which includes a third communication interface configured to receive the estimated value indicating the remaining amount from the information processing apparatus, a second controller configured to determine presentation information based on the estimated value indicating the remaining amount, and an information presentation unit configured to present the presentation information,
wherein
the second communication interface transmits the remaining amount to an external device, and
when the calculated value indicating the remaining amount decreases by a predetermined value or more within a predetermined time period, the first controller does not perform the determination of the estimated value on the basis of the calculated value.

8. A non-transient computer readable storage medium which stores program instructions which, when executed by an information processing apparatus, cause the information processing apparatus to:
receive information indicating an orientation of a container;
calculate a calculated value indicating a remaining amount of contents of the container based on the information indicating the orientation of the container;
determine an estimated value indicating the remaining amount based on the calculated value; and
transmit the estimated value indicating the remaining amount to an external device, wherein the external device presents the estimated value indicating the remaining amount,
wherein, when the calculated value indicating the remaining amount decreases by a predetermined value or more within a predetermined time period, determination of the estimated value on the basis of the calculated value is not performed.

* * * * *